(12) United States Patent
Shim et al.

(10) Patent No.: US 11,161,771 B2
(45) Date of Patent: Nov. 2, 2021

(54) GLASS ARTICLE AND DISPLAY DEVICE INCLUDING THE SAME

(71) Applicant: Samsung Display Co., LTD., Yongin-si (KR)

(72) Inventors: Gyu In Shim, Yongin-si (KR); Byung Hoon Kang, Hwaseong-si (KR); Seung Hoon Kim, Seongnam-si (KR); Young Ok Park, Hwaseong-si (KR); Su Jin Sung, Hwaseong-si (KR)

(73) Assignee: SAMSUNG DISPLAY CO., LTD., Gyeonggi-Do (KR)

(*) Notice: Subject to any disclaimer, the term of this patent is extended or adjusted under 35 U.S.C. 154(b) by 0 days.

(21) Appl. No.: 16/937,628

(22) Filed: Jul. 24, 2020

(65) Prior Publication Data

US 2021/0188695 A1    Jun. 24, 2021

(30) Foreign Application Priority Data

Dec. 20, 2019    (KR) .......................... 10-2019-0171428

(51) Int. Cl.
*G06F 1/16*    (2006.01)
*C03C 3/087*    (2006.01)

(52) U.S. Cl.
CPC ............ *C03C 3/087* (2013.01); *G06F 1/1609* (2013.01); *G06F 1/1652* (2013.01)

(58) Field of Classification Search
CPC .... G06F 1/1601; G06F 1/1633; G06F 1/1637; G06F 1/1656; C03C 3/087
See application file for complete search history.

(56) References Cited

U.S. PATENT DOCUMENTS

| 2006/0003545 | A1 | 1/2006 | Veerasamy |
| 2011/0201490 | A1 | 8/2011 | Barefoot et al. |
| 2015/0030834 | A1 | 1/2015 | Morey et al. |
| 2017/0113963 | A1* | 4/2017 | Kim ........................ C03B 18/02 |

(Continued)

FOREIGN PATENT DOCUMENTS

| KR | 1020130132506 A | 12/2013 |
| KR | 1020150129732 A | 11/2015 |

(Continued)

OTHER PUBLICATIONS

Extended European Search Report—European Application No. 20197656.0 dated Mar. 23, 2021, citing references listed within.

*Primary Examiner* — Adrian S Wilson
(74) *Attorney, Agent, or Firm* — Cantor Colburn LLP

(57) ABSTRACT

A glass article includes first and second surfaces opposed to each other; a first compressive region extending from the first surface to a point at a first compression depth; a second compressive region extending from the second surface to a point a second compression depth; and a tensile region disposed between the first and second compressive regions. A stress profile of the first compressive region includes a first segment between the first surface and a first transition point and a second segment between the first transition point and the first compression depth. A depth from the first surface to the first transition point is 8.1 μm to 9.5 μm, a stress at the first transition point is greater than or equal to 197 MPa, and a stress at a point of 50 μm in a depth direction from the first surface is greater than or equal to 75 MPa.

22 Claims, 16 Drawing Sheets

(56) References Cited

U.S. PATENT DOCUMENTS

| | | | |
|---|---|---|---|
| 2017/0158556 A1* | 6/2017 | Dejneka | G06F 1/1637 |
| 2017/0197876 A1 | 7/2017 | Oram et al. | |
| 2017/0341973 A1 | 11/2017 | Gross et al. | |
| 2019/0375679 A1 | 12/2019 | Gross et al. | |
| 2021/0179488 A1* | 6/2021 | Sung | C03C 21/002 |
| 2021/0179489 A1* | 6/2021 | Kang | H01L 27/156 |
| 2021/0188695 A1* | 6/2021 | Shim | G06F 1/1652 |
| 2021/0188703 A1* | 6/2021 | Kang | C03C 21/002 |

FOREIGN PATENT DOCUMENTS

| | | |
|---|---|---|
| KR | 1020150140570 A | 12/2015 |
| KR | 1020170130498 A | 11/2017 |
| KR | 1020180007044 A | 1/2018 |
| KR | 1020180057814 A | 5/2018 |
| KR | 1020180136490 A | 12/2018 |
| KR | 1020190012143 A | 2/2019 |
| KR | 1020190099233 A | 8/2019 |
| WO | 2016014937 | 1/2016 |

* cited by examiner

GLASS ARTICLE AND DISPLAY DEVICE INCLUDING THE SAME

This application claims priority to Korean Patent Application No. 10-2019-0171428, filed on Dec. 20, 2019, and all the benefits accruing therefrom under 35 U.S.C. 119, the content of which in its entirety is herein incorporated by reference.

BACKGROUND

1. Field

The disclosure relates to a glass article and a display device including the glass article.

2. Description of the Related Art

Glass articles are widely used in electronic devices including display devices or construction materials. More particularly, a glass article is applied to a substrate of a flat panel display device such as a liquid crystal display ("LCD"), an organic light emitting display ("OLED") and an electrophoretic display ("EPD"), or a cover window for protecting elements covered thereby.

SUMMARY

As portable electronic devices including glass articles, such as smart phones and tablet personal computers ("PC"s), have become more widely used, such glass articles may be frequently exposed to external impacts. Accordingly, it is desired to develop a glass article which is thin for portability and can withstand external impacts. Attempts have been made to improve the strength of a glass article by thermal or chemical strengthening but more precise stress profile management is desired to meet customer needs.

Embodiments of the disclosure provide a display device including a glass article having high strength through a precise stress profile.

An embodiment of a glass article includes a first surface; a second surface opposed to the first surface; a first compressive region extending from the first surface to a point at a first compression depth from the first surface; a second compressive region extending from the second surface to a point at a second compression depth from the second surface; and a tensile region disposed between the first compressive region and the second compressive region. In such an embodiment, a stress profile of the first compressive region includes a first segment between the first surface and a first transition point, and a second segment between the first transition point and the first compression depth, where a depth from the first surface to the first transition point is in a range of about 8.1 micrometers (μm) to about 9.5 μm, where a stress at the first transition point is greater than or equal to about 197 megapascals (MPa), and where a stress at a point of 50 μm in a depth direction from the first surface is greater than or equal to about 75 MPa.

An embodiment of a display device includes a display panel including a plurality of pixels; a cover window disposed above the display panel; and an optically transparent bonding layer disposed between the display panel and the cover window. In such an embodiment, the cover window includes: a first surface; a second surface opposed to the first surface; a first compressive region extending from the first surface to a point at a first compression depth from the first surface; a second compressive region extending from the second surface to a point at a second compression depth from the second surface; and a tensile region disposed between the first compressive region and the second compressive region. In such an embodiment, a stress profile of the first compressive region includes a first segment between the first surface and a first transition point, and a second segment located between the first transition point and the first compression depth, where a depth from the first surface to the first transition point is in a range of about 8.1 μm to about 9.5 μm, where a stress at the first transition point is greater than or equal to about 197 MPa, and where a stress at a point of about 50 μm in a depth direction from the first surface is greater than or equal to about 75 MPa.

According to embodiments of the glass article and the display device including the glass article, the glass article may have a high strength such that the glass article is not easily broken by an external impact by precisely controlling the stress profile.

BRIEF DESCRIPTION OF THE DRAWINGS

The above and other features of the disclosure will become more apparent by describing in detail exemplary embodiments thereof with reference to the accompanying drawings, in which.

DETAILED DESCRIPTION

Figure 1:
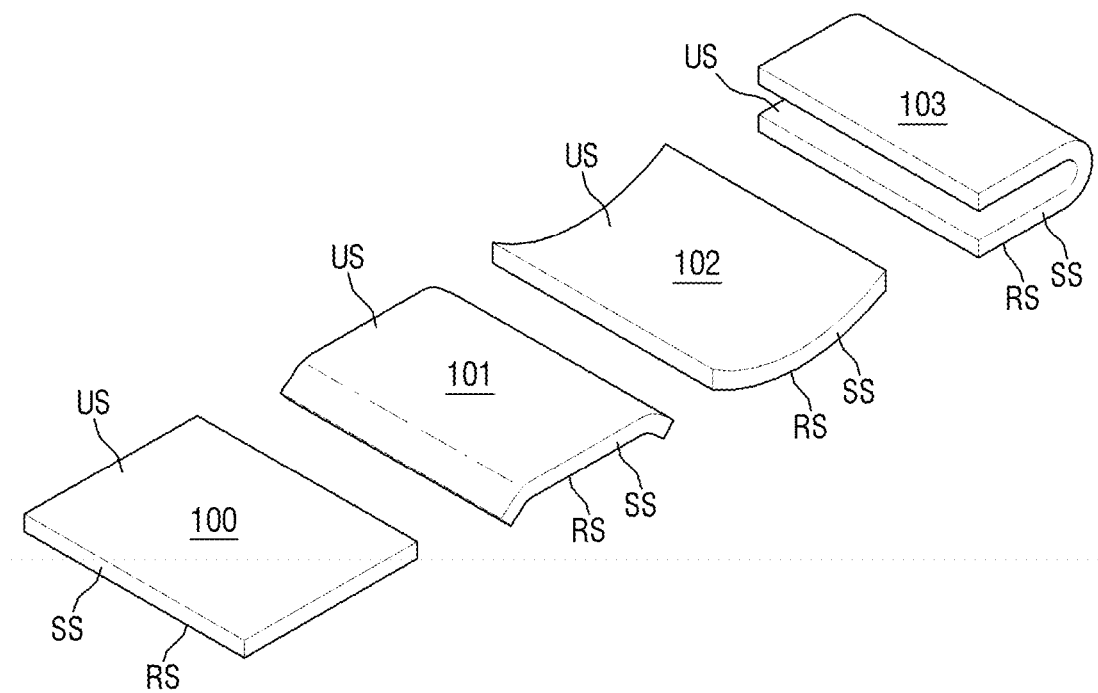
FIG. 1 is a perspective view of a glass article according to various embodiments.

The invention will now be described more fully hereinafter with reference to the accompanying drawings, in which various embodiments of the invention are shown. This invention may, however, be embodied in different forms and should not be construed as limited to the embodiments set forth herein. Rather, these embodiments are provided so that this disclosure will be thorough and complete, and will filly convey the scope of the invention to those skilled in the art.

It will also be understood that when a layer is referred to as being "on" another layer or substrate, it can be directly on the other layer or substrate, or intervening layers may also be present. In contrast, when an element is referred to as being "directly on" another element, there are no intervening elements present.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, "a", "an," "the," and "at least one" do not denote a limitation of quantity, and are intended to include both the singular and plural, unless the context clearly indicates otherwise. For example, "an element" has the same meaning as "at least one element," unless the context clearly indicates otherwise. "At least one" is not to be construed as limiting "a" or "an." "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The same reference numbers indicate the same components throughout the specification.

As used herein, the term "glass article" refers to an article made entirely or partially of glass.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10% or 5% of the stated value.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the claims.

Hereinafter, exemplary embodiments of the disclosure will be described in detail with reference to the accompanying drawings.

FIG. 1 is a perspective view of a glass article according to various embodiments.

A glass article may be used as a cover window for protecting a display panel, a substrate for a display panel, a substrate for a touch panel, an optical member such as a light guide plate and the like in electronic devices including a display panel, such as a tablet personal computer ("PC"), a laptop computer, a smart phone, an electronic book, a television and a PC monitor as well as a refrigerator and a cleaning machine including a display screen. A glass article may also be employed as a cover glass for a dashboard of a vehicle, a cover glass for solar cells, interior materials for construction materials, windows for buildings and houses, and the like.

Some glass articles are desired to have high strength. In one embodiment, for example, where a glass article is employed as a window, the window is desired to have a small thickness to have high transmittance and lightweight, and also have high strength such that the window is not easily broken by an external impact. Strengthened glass may be produced by, for example, chemical strengthening or thermal strengthening. Various embodiments of a strengthened glass article having various shapes are shown in FIG. 1.

Referring to FIG. 1, in an exemplary embodiment, a glass article 100 may have a flat sheet shape or a flat plate shape. In an alternative exemplary embodiment, a glass article 101, 102 or 103 may have a three-dimensional shape including bent portions. In one exemplary embodiment, for example, the edges of the flat portion of the glass article may be bent (e.g., the glass article 101), or the flat portion of the glass article may be entirely curved (e.g., the glass article 102) or folded (e.g., the glass article 103).

In an exemplary embodiment, the planar shape of the glass articles 100 to 103 may be a rectangular shape, but is not limited thereto. Alternatively, the planar shape of the glass articles 100 may have one of various shapes such as a rectangular shape with rounded corners, a square shape, a circular shape, and an elliptical shape. Hereinafter, for convenience of description, exemplary embodiments where the glass articles 100 has a shape of a flat plate having a rectangular planar shape will be described in detail, but the disclosure is not limited thereto.

Figure 2:
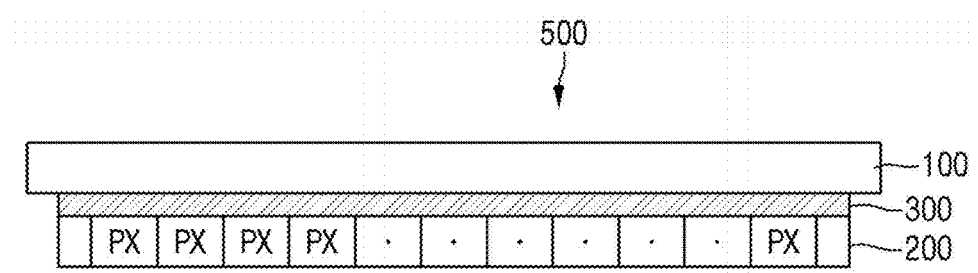
FIG. 2 is a cross-sectional view illustrating an exemplary embodiment in which a glass article is applied to a cover window of a display device.

FIG. 2 is a cross-sectional view illustrating an exemplary embodiment in which a glass article is applied to a cover window of a display device.

Referring to FIG. 2, an exemplary embodiment of a display device 500 may include a display panel 200, a glass article 100 disposed on the display panel 200 and serving as a cover window, and an optically transparent bonding layer 300 disposed between the display panel 200 and the glass article 100 to bond the display panel 200 and the glass article 100 to each other.

In such an embodiment, the display panel 200 may include not only a self-luminous display panel such as an organic light emitting display ("OLED") panel, an inorganic electroluminescence ("EL") display panel, a quantum dot ("QED") display panel, a micro light emitting display ("micro-LED") panel, a nano light emitting display ("nano-LED") panel, a plasma display panel ("PDP"), a field emission display ("FED") panel and a cathode ray tube ("CRT") display panel, but also a light receiving display panel such as a liquid crystal display ("LCD") panel and an electrophoretic display ("EPD") panel.

The display panel 200 includes a plurality of pixels PX and may display an image by using light emitted from each pixel PX. The display device 500 may further include a touch member (not shown). In an exemplary embodiment, the touch member may be embedded in the display panel 200. In one exemplary embodiment, for example, the touch member is directly formed on a display member of the display panel 200, such that the display panel 200 itself may perform a touch function. In an alternative exemplary embodiment, the touch member may be manufactured separately from the display panel 200 and then attached to the top surface of the display panel 200 by an optically transparent bonding layer.

The glass article 100 is disposed above the display panel 200 to protect the display panel 200. In an exemplary embodiment, the glass article 100 is larger in size than the display panel 200, such that the side surface SS (shown in FIG. 1) thereof may protrude outward from the side surface of the display panel 200, but it is not limited thereto. The display device 500 may further include a print layer (not shown) disposed on at least one surface of the glass article 100 at an edge portion thereof. The print layer may prevent the bezel area of the display device 500 from being visible from the outside, and may perform a decoration function.

The optically transparent bonding layer 300 is disposed between the display panel 200 and the glass article 100. The optically transparent bonding layer 300 serves to fix the glass article 100 onto the display panel 200. The optically transparent bonding layer 300 may include an optically clear adhesive ("OCA"), an optically clear resin ("OCR"), or the like.

Hereinafter, the strengthened glass article 100 will be described in greater detail.

Figure 3:
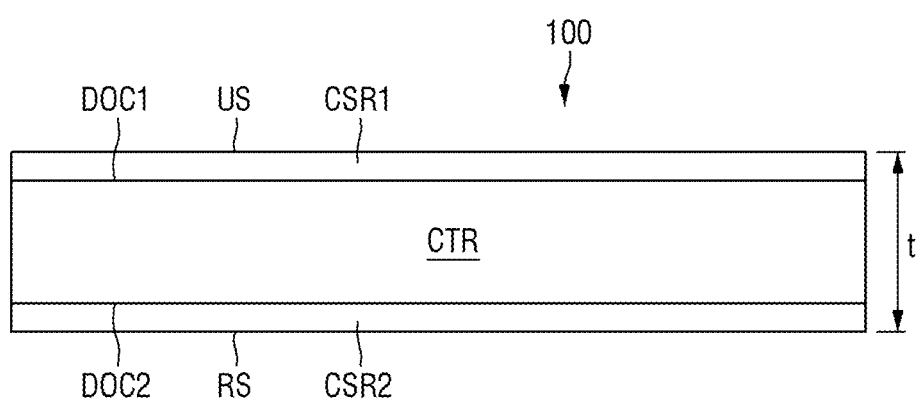
FIG. 3 is a cross-sectional view of a glass article having a flat plate shape according to an exemplary embodiment.

FIG. 3 is a cross-sectional view of a glass article having a flat plate shape according to an exemplary embodiment.

Referring to FIG. 3, an exemplary embodiment of the glass article 100 may include a first surface US, a second surface RS and a side surface. In the glass article 100 having a flat plate shape, the first surface US and the second surface RS are main surfaces having a large area, and the side surface is an outer surface connecting the first surface US with the second surface RS.

The first surface US and the second surface RS are opposed to each other in the thickness direction. In an exemplary embodiment, where the glass article 100 serves to transmit light in the same manner as the cover window of a display, the light may be mainly incident on one of the first surface US and the second surface RS and pass through the other one.

A thickness t of the glass article 100 is defined as a distance between the first surface US and the second surface RS. The thickness t of the glass article 100 may be in a range, but is not limited to, from about 0.1 millimeter (mm) to about 2 mm. In one exemplary embodiment, for example, the thickness t of the glass article 100 may be about 0.8 mm or less. In an alternative exemplary embodiment, the thickness t of the glass article 100 may be about 0.75 mm or less. In another alternative exemplary embodiment, the thickness t of the glass article 100 may be about 0.7 mm or less. In yet another alternative exemplary embodiment, the thickness t of the glass article 100 may be about 0.6 mm or less. In yet another alternative exemplary embodiment, the thickness t of the glass article 100 may be about 0.65 mm or less. In yet another alternative exemplary embodiment, the thickness t of the glass article 100 may be about 0.5 mm or less. In yet another alternative exemplary embodiment, the thickness t of the glass article 100 may be about 0.3 mm or less. In some exemplary embodiments, the thickness t of the glass article 100 may be in a range from about 0.6 mm to about 0.8 mm or in a range from about 0.69 mm to about 0.71 mm. The glass article 100 may have a uniform thickness t, but is not limited thereto and may have a different thickness t for each region. Hereinafter, for convenience of description, exemplary embodiments where the glass article 100 has a thickness of about 0.70 mm will be described in detail, but the disclosure is not limited thereto.

The glass article 100 may be strengthened to have a predetermined stress profile therein. The strengthened glass article 100 more efficiently prevents generation of cracks, propagation of cracks, breakage and the like due to external impact than the glass article 100 before strengthening. The glass article 100 strengthened by a strengthening process may have a different stress for each region. In one exemplary embodiment, for example, compressive regions CSR1 and CSR2 to which a compressive stress is applied may be disposed in the vicinity of the surface of the glass article 100, i.e., near the first surface US and the second surface RS, and a tension region CTR to which a tensile stress is applied may be disposed inside the glass article 100. A boundary between the compressive region CSR1, CSR2 and a tensile region CTR may have a stress value of zero. The compressive stress in one compressive region CSR1, CSR2 may vary in its stress value depending on the position (i.e. depth from the surface). Also, the tensile region CTR may have a different stress value depending on the depth from the surface US, RS.

The position of the compressive region CSR1, CSR2, the stress profile in the compressive region CSR1, CSR2, the compressive energy of the compressive region CSR1, CSR2, the tensile energy of the tensile region CTR or the like in the glass article 100 has a great influence on the mechanical properties of the glass article 100 such as the surface strength, which will be described later in greater detail.

Figure 4:
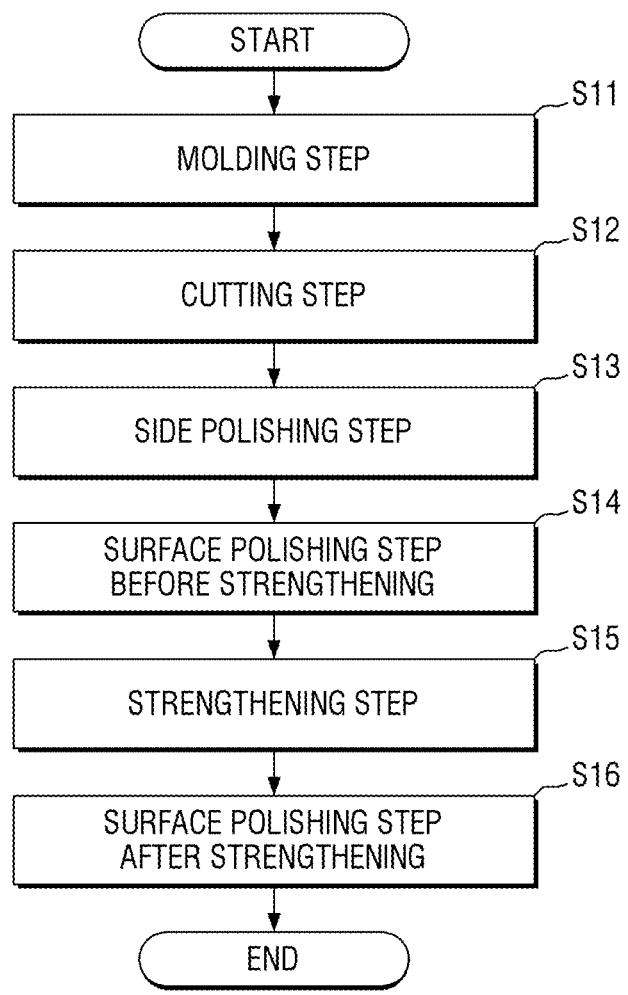
FIG. 4 is a flowchart showing the steps of a method for producing a glass article according to an exemplary embodiment.
Figure 5:
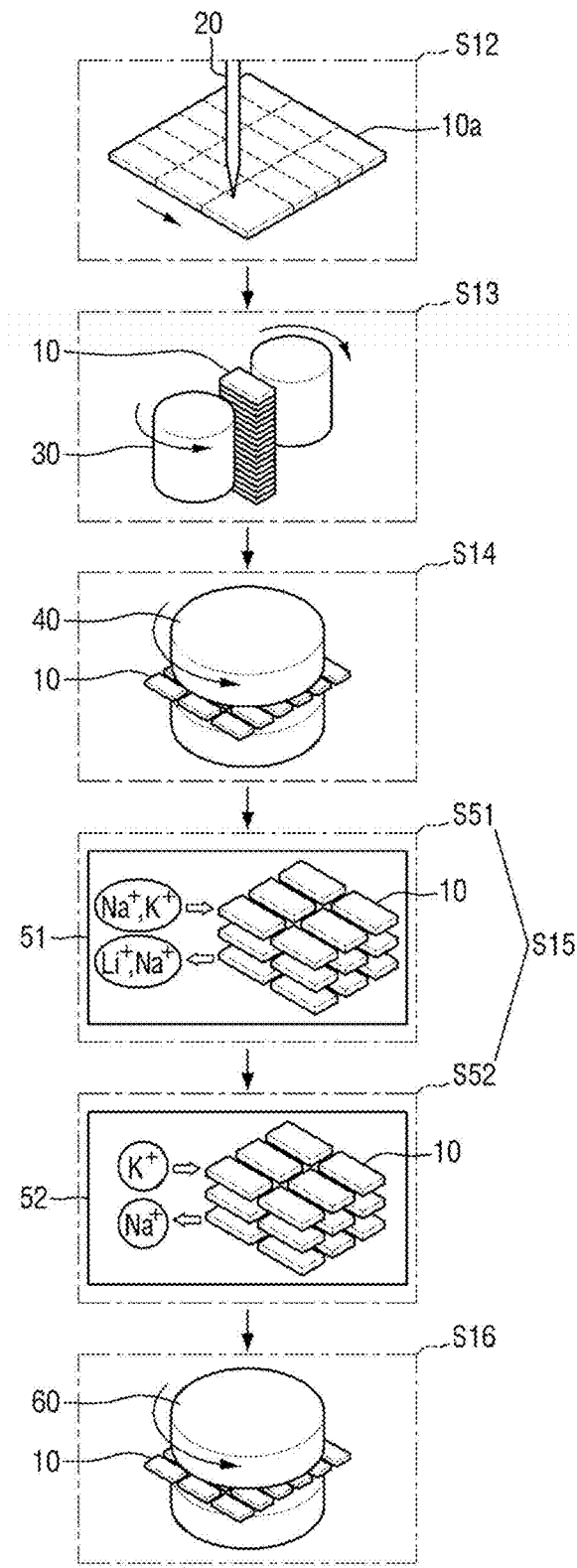
FIG. 5 is a diagram schematically showing the processes of FIG. 4 from a cutting step to a surface polishing step after strengthening.

FIG. 4 is a flowchart showing a method for producing a glass article according to an exemplary embodiment. FIG. 5 is a diagram schematically showing the processes of FIG. 4 from a cutting process to a surface polishing process after strengthening.

Referring to FIGS. 4 and 5, an exemplary embodiment of the method for producing the strengthened glass article 100 may include a molding step (or process) S11, a cutting step S12, a side polishing step S13, a surface polishing step S14 before strengthening (or a first surface polishing step), and a strengthening step S15, and a surface polishing step S16 after strengthening (or a second surface polishing step).

The molding step S11 may include preparing a glass composition and molding the glass composition.

The glass composition may include at least one material selected from various compositions known in the art. In an exemplary embodiment, the glass composition may include a lithium-alumina-silicon ("LAS") glass ceramics containing lithium aluminosilicate. In one exemplary embodiment, for example, the glass composition may contain 50 to 80 mol % of $SiO_2$, 1 to 30 mol % of $Al_2O_3$, 0 to 5 mol % of $B_2O_3$, 0 to 4 mol % of $P_2O_5$, 3 to 20 mol % of $Li_2O$, 0 to 20 mol % of $Na_2O$, 0 to 10 mol % of $K_2O$, 3 to 20 mol % of MgO, 0 to 20 mol % of CaO, 0 to 20 mol % of SrO, 0 to 15 mol % of BaO, 0 to 10 mol % of ZnO, 0 to 1 mol % of $TiO_2$, and 0 to 8 mol % of $ZrO_2$.

The term "the content is 0 mol %" as used herein means that it does not substantially contain the corresponding component. The term "(composition) does not substantially contain (a certain component)" as used herein means that the certain component is not intentionally contained in raw materials and the like, and includes, for example, a case in which a tiny amount (e.g., 0.1 mol % or less) of impurities are inevitably contained.

Hereinafter, each component of the glass composition will be described in greater detail. In an embodiment of the glass composition, $SiO_2$ constitutes the skeleton of glass, may increase the chemical durability, and may serve to reduce the occurrence of cracks when scratches (indentations) are made on the glass surface. In an embodiment, $SiO_2$ may be contained in an amount of 50 mol % or greater to improve the chemical durability. In an embodiment, for sufficient meltability, $SiO_2$ may be contained in the glass composition in an amount of 80 mol % or less.

$Al_2O_3$ serves to improve the breakage resistance of glass. That is, $Al_2O_3$ may serve to generate a smaller number of fragments when the glass is broken. In addition, $Al_2O_3$ may serve as an active component that improves the ion exchange performance during chemical strengthening and increases surface compressive stress after strengthening. In an embodiment, the content of $Al_2O_3$ is 1 mol % or greater, such that the above-described function may be effectively performed. In an embodiment, the content of $Al_2O_3$ may be 30 mol % or less to maintain the acid resistance and meltability of glass.

$B_2O_3$ enhances the chipping resistance of glass and improves the meltability of glass. In an embodiment, $B_2O_3$ may be omitted (or contained in the amount of 0 mol %). Alternatively, $B_2O_3$ may be contained in an amount of 0.5 mol % or greater to improve the meltability of glass. In such an embodiment, $B_2O_3$ may be contained in an amount of 5 mol % or less to suppress the occurrence of striae during melting.

$P_2O_5$ improves the ion exchange performance and chipping resistance. In an embodiment, $P_2O_5$ may be omitted (0 mol %). Alternatively, $P_2O_5$ may be contained in an amount of 0.5 mol % or greater to effectively perform the above-described function. In such an embodiment, $P_2O_5$ may be contained in an amount of 4 mol % or less to prevent a significant decrease in breakage resistance and acid resistance.

$Li_2O$ serves to form surface compressive stress by ion exchange. Li ions near the glass surface may be exchanged with Na ions or the like through an ion exchange process. $Li_2O$ may also serve to improve the breakage resistance of glass. The content of $Li_2O$ for effective ion exchange is 3 mol % or greater, and the content of $Li_2O$ may be 20 mol % or less in terms of acid resistance.

$Na_2O$ serves to form surface compressive stress by ion exchange and improve the meltability of glass. Na ions near the glass surface may be exchanged with K ions or the like through an ion exchange process. In an embodiment, $Na_2O$ may be omitted. Alternatively, $Na_2O$ may be contained in an amount of 1 mol % or greater to effectively perform the above-described role. If only a Li and Na ion exchange process is performed and a K ion exchange process is not performed, the content of $Na_2O$ may be 8 mol % or less for smooth Li and Na ion exchange. If a K ion exchange process is also performed, a larger amount of $Na_2O$ may be used. However, also in this case, the content of $Na_2O$ may be 20 mol % or less for effective acid resistance.

$K_2O$ improves the ion exchange performance and is associated with the breakage resistance. In an embodiment, $K_2O$ may be omitted. Alternatively, $K_2O$ may be contained in an amount of 0.5 mol % or greater to improve the ion exchange performance. In such an embodiment, the content of $K_2O$ may be 10 mol % or less to prevent an excessive decrease in breakage resistance.

MgO serves. In an embodiment, the content of MgO is 3 mol % or greater to effectively increase the surface compressive stress and improve the breakage resistance of chemically strengthened glass. In such an embodiment, the content of MgO may be 20 mol % or less to reduce the occurrence of devitrification during glass melting.

CaO serves to improve the meltability and breakage resistance of glass. In an embodiment, CaO may be omitted. Alternatively, CaO may be contained in a content of 0.5 mol % or greater to effectively improve the meltability and breakage resistance of glass. If the content of CaO is excessively high, the ion exchange performance may be degraded. Accordingly, in such an embodiment, the content of CaO may be 20 mol % or less.

SrO serves to improve the meltability and breakage resistance of glass, similarly to CaO. In an embodiment, SrO may be omitted. Alternatively, SrO may be contained in a content of 0.5 mol % or greater to effectively improve the meltability and breakage resistance of glass. If the content of SrO is excessively high, the ion exchange performance may be degraded. Accordingly, in such an embodiment, the content of SrO may be 20 mol % or less.

BaO serves to improve the meltability and breakage resistance of glass. In an embodiment, BaO may be omitted. Alternatively, BaO may be contained in a content of 0.5 mol % or greater to effectively improve the meltability and breakage resistance of glass. In such an embodiment, BaO may be contained in an amount of 15 mol % or less to prevent an excessive decrease in ion exchange performance.

ZnO serves to improve the meltability of glass. In an embodiment, ZnO may be omitted. Alternatively, ZnO may be contained in a content of 0.25 mol % or greater to significantly exhibit the effect of improving meltability. In such an embodiment, the content of ZnO may be 10 mol % or less to prevent a decrease in weatherability.

$TiO_2$ improves the breakage resistance of chemically strengthened glass. In an embodiment, $TiO_2$ may be omitted.

Alternatively, $TiO_2$ may be contained in a content of 0.1 mol % or greater to significantly exhibit the effect of improving breakage resistance when. In such an embodiment, the content of $TiO_2$ may be 1 mol % or less to prevent devitrification during melting.

$ZrO_2$ may increase the surface compressive stress due to ion exchange and improve the breakage resistance of glass. In an embodiment, $ZrO_2$ may be omitted. Alternatively, $ZrO_2$ may be contained in a content of 0.5 mol % or greater to effectively increase the surface compressive stress due to ion exchange and to effectively improve the breakage resistance of glass. In such an embodiment, $ZrO_2$ may be contained in an amount of 8 mol % or less to suppress devitrification during melting.

The glass composition may further include components such as $Y_2O_3$, $La_2O_3$, $Nb_2O_5$, $Ta_2O_5$ and $Gd_2O_3$ in addition to the components described above. The composition of the glass article 100 may be changed through a molding process, an ion exchange process, and the like, which will be described later.

The composition and composition ratio of the glass composition may be determined in consideration of the strain point of the finished strengthened glass. In general, the viscosity of the glass varies with temperature, and the temperature at which the glass has a viscosity of about $10^{14.5}$ poise is defined as a strain point. As the strain point increases, the scratch resistance of glass improves. However, if the strain point excessively increases, the elasticity of the glass article 100 decreases, which may be undesired in terms of product conformity. According to the experimental findings, when the strain point of the glass article 100 is in the range of 530° C. to 540° C., it may have sufficient scratch resistance and appropriate elasticity to ensure product conformity. The strain point may be adjusted by the components and composition ratio of the glass article 100. In an embodiment, the components and composition ratio of the glass composition may be adjusted in the molding step S11 to satisfy the strain point of the above-mentioned range.

The glass composition described above may be molded into a plate glass shape by at least one of various methods known in the art. In one exemplary embodiment, for example, the glass composition may be molded by a float process, a fusion draw process, a slot draw process, or the like.

The glass molded into a flat plate shape may be cut through the cutting step S12. The glass molded into a flat plate shape may have a different size than that of the final glass article 100. In one exemplary embodiment, for example, glass molding may be performed to form a large-area substrate as a mother substrate glass 10a including a plurality of glass articles 100, as shown in FIG. 5. The mother substrate glass 10a may be cut into a plurality of cell glasses 10 to produce a plurality of glass articles 100. In one exemplary embodiment, for example, where the final glass article 100 has a size of about 6 inches, glass may be molded to have a size of several to several hundred times, e.g., 120 inches and then cut. Accordingly, in such an embodiment, 20 glass articles molded into a flat plate shape may be obtained at once, such that process efficiency may be improved as compared with a case of molding an individual glass article 100 separately. In an exemplary embodiment, when molding the glass corresponding to the size of one glass article 100, if the final glass article 100 has various planar shapes, the final glass article 100 may be made into a desired shape through a cutting process.

Cutting of the glass 10a may be performed using a cutting knife 20, a cutting wheel, a laser, or the like.

In an exemplary embodiment, the cutting step S12 of glass may be performed before the strengthening step S15 of glass. The glass 10a of a mother substrate may be strengthened at once and then cut into the size of the final glass article 100. However, in this case, the cut surface (e.g., side surface of glass) may be in a non-strengthened state. Accordingly, it may be desired to perform the strengthening step S15 after cutting is completed.

Between the cutting step S12 and the strengthening step S15 of glass, a polishing step before strengthening may be performed. The polishing step may include the side polishing step S13 and the surface polishing step S14 before strengthening. In an exemplary embodiment, after the side polishing step S13 is performed first, the surface polishing step S14 may be performed before strengthening, but the order of polishing may be modified or reversed.

The side polishing step S13 is a step of polishing the side surface of a cut glass 10. In the side polishing step S13, the side surface of the glass 10 is polished to have a smooth surface. In such an embodiment, each side surface of the glass 10 may have a uniform (e.g., even or smooth) surface through the side polishing step S13. In such an embodiment, the cut glass 10 may include one or more cut surfaces. In some cut glasses 10, two side surfaces of four side surfaces may be cut surfaces. In some other cut glasses 10, three side surfaces of four side surfaces may be cut surfaces. In some other cut glasses 10, all of four side surfaces may be cut surfaces. When the side surface is a cut surface, it may have different surface roughness from that of an uncut surface. In addition, even the cut surfaces may have different surface roughness from each other. Therefore, in such an embodiment, each side surface may have uniform surface roughness and the like by polishing each side surface through the side polishing step S13. In such an embodiment, a small crack, which may occur on the side surface, may be removed through the side polishing step S13.

The side polishing step S13 may be performed simultaneously on a plurality of cut glasses 10. In an exemplary embodiment, as shown in FIG. 5, the stacked glasses 10 may be polished at the same time in a state where the plurality of cut glasses 10 are stacked.

The side polishing step S13 may be performed by a mechanical polishing method or a chemical mechanical polishing method using a polishing apparatus 30. In an exemplary embodiment, two opposite side surfaces of the cut glasses 10 may be polished simultaneously, and then the other two opposite side surfaces may be polished simultaneously, but the disclosure is not limited thereto.

The surface polishing step S14 before strengthening may be performed such that each glass 10 has a uniform surface. The surface polishing step S14 before strengthening may be performed separately for each cut glass 10. However, when a chemical mechanical polishing apparatus 40 is sufficiently large compared to the glass 10, the plurality of glasses 10 may be horizontally arranged and then surface polishing may be performed simultaneously.

The surface polishing step S14 before strengthening may be performed by chemical mechanical polishing. In an exemplary embodiment, the first and second surfaces of the cut glass 10 are polished using the chemical mechanical polishing apparatus 40 and a polishing slurry. The first surface and the second surface may be polished simultaneously. Alternatively, one surface of the first and second surfaces may be polished first and then the other surface of the first and second surfaces may be polished.

After the polishing step S14 before strengthening, the strengthening step S15 is performed. The strengthening step S15 may include chemical strengthening and/or thermal strengthening. In an exemplary embodiment where the glass 10 has a thin thickness of 2 mm or less, e.g., about 0.75 mm or less, a chemical strengthening method may be applied for precise stress profile control. Hereinafter, for convenience of description, exemplary embodiments where a chemical strengthening method is applied to the strengthening step S15 of the glass 10 will be describe in detail, but not being limited thereto.

Chemical strengthening may be performed through an ion exchange process. The ion exchange process is a process of exchanging ions in the glass 10 with other ions. By performing the ion exchange process, the ions at or near the surface of the glass 10 may be replaced or exchanged with larger ions having the same valence or oxidation state. In one exemplary embodiment, for example, where the glass 10 contains a monovalent alkali metal such as Li+, Na+, K+ and Rb+, the monovalent cation on the surface may be replaced by Na+, K+, Rb+, or Cs+ ions with a larger ionic radius. The ion exchange process will hereinafter be described in greater detail with reference to FIG. 6.

Figure 6:
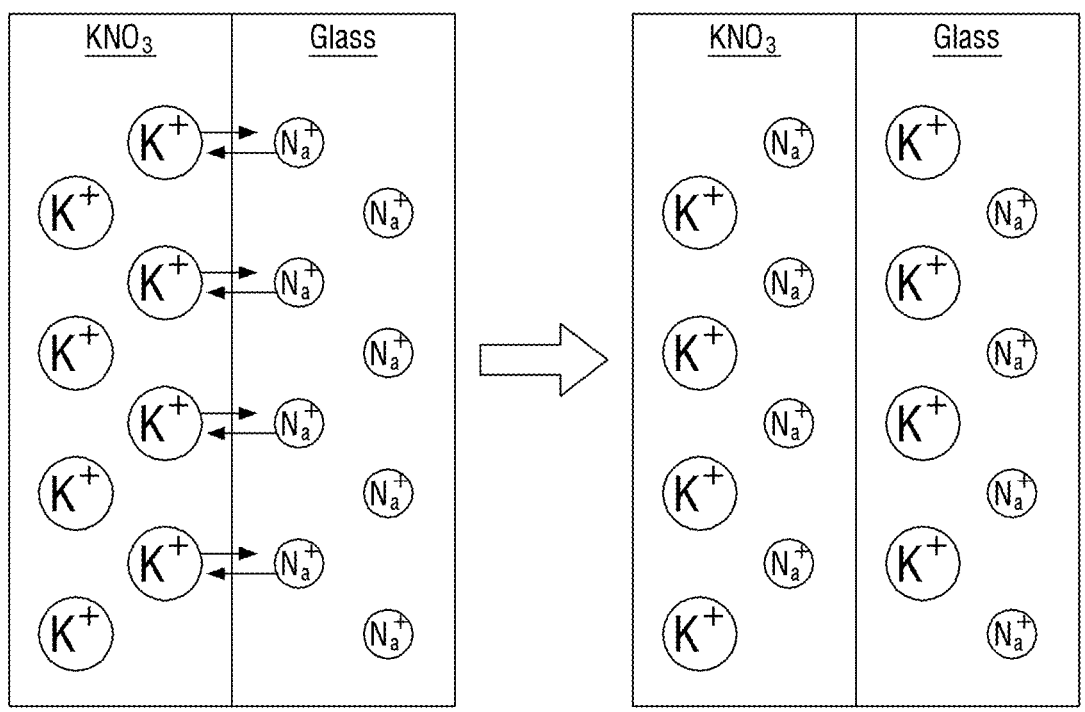
FIG. 6 is a schematic diagram illustrating an ion exchange process according to an exemplary embodiment.

FIG. 6 is a schematic diagram illustrating an ion exchange process according to an exemplary embodiment. FIG. 6 illustrates a case where sodium ions inside the glass are exchanged with potassium ions.

Referring to FIG. 6, when the glass containing sodium ions is exposed to potassium ions by, for example, immersing the glass in a molten salt bath containing potassium nitrate, sodium ions in the glass are discharged to the outside and the potassium ions may replace the sodium ions. The exchanged potassium ions generate compressive stress because the potassium ions have a larger ionic radius than sodium ions. The greater the amount of potassium ions exchanged is, the greater the compressive stress becomes. Since the ion exchange occurs through the surface of the glass, the amount of potassium ions on the glass surface is the greatest. Although some of the exchanged potassium ions may diffuse into the glass to increase the depth of a compressive region, i.e., a compression depth, the amount of the exchanged potassium ions may generally decrease as being away from the surface. Thus, the glass may have a stress profile that has the greatest compressive stress on the surface and decreases toward the inside. However, the exemplary embodiments are not limited thereto. The stress profile may be modified depending on the temperature, time, number of times, presence or absence of heat treatment and/or the like of the ion exchange process.

Referring back to FIGS. 4 and 5, the ion exchange process may be performed two or more times. In one exemplary embodiment, for example, the ion exchange process may include a primary ion exchange process S51 and a secondary ion exchange process S52. The primary ion exchange process S51 and the secondary ion exchange process S52 may be performed in different baths 51 and 52, respectively. Each ion exchange process S51, S52 may be performed simultaneously on the plurality of glasses 10. That is, by immersing the plurality of glasses 10 in a single bath 51 or 52, the ion exchange process may be performed simultaneously on the plurality of glasses 10. The ion exchange process will be described later in greater detail.

After the strengthening step S15, selectively, the surface polishing step S16 after the strengthening may be further performed. The surface polishing step S16 after strengthening may remove fine cracks on the surface of the strengthened glass 10 and control compressive stress of the first surface and the second surface of the strengthened glass 10. In one exemplary embodiment, for example, a floating method, which is one of methods for producing a glass plate, is performed by flowing a glass composition into a tin bath. In such an embodiment, the surface of the glass plate in contact with the tin bath may have different compositions from the surface not in contact with the tin bath. As a result, after the strengthening step S15 of the glass 10, a deviation in compressive stress may occur between the surface in contact with the tin bath and the surface not in contact with the tin bath. In such an embodiment, the deviation in compressive stress between the contact surface and the non-contact surface may be reduced by removing the surface of the glass 10 to an appropriate thickness by polishing.

The surface polishing step S16 after strengthening may be performed by a chemical mechanical polishing method. In an exemplary embodiment, the first and second surfaces of the strengthened glass 10, which is the glass 10 to be processed, are polished using a chemical mechanical polishing apparatus 60 and a polishing slurry. In an exemplary embodiment, the polishing thickness may be, for example, in a range of about 100 nm to about 1000 nm, but not being limited thereto. The polishing thicknesses of the first surface and the second surface may be the same as each other, or alternatively, may be different from each other.

Although not shown in the drawings, after the surface polishing step S16 after strengthening, a shape machining process may be further performed as desired. In an exemplary embodiment where the glass article having a three-dimensional shape 101, 102 or 103 is produced as shown in FIG. 1, a three-dimensional machining process may be performed after completion of the surface polishing step S16 after strengthening.

In such an embodiment, as described above, the finished glass article 100 has a strain point in the temperature range of about 530° C. to about 540° C., and thus may have high scratch resistance.

Hereinafter, the stress profile of the strengthened glass article 100 will be described in detail.

Figure 7:
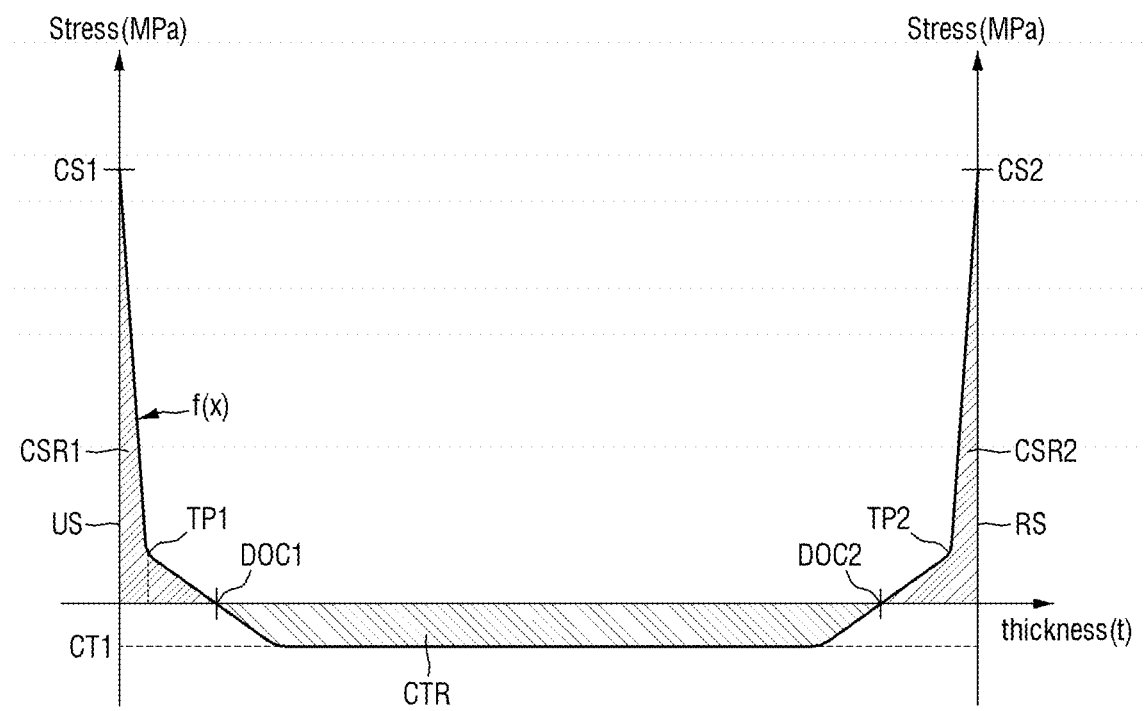
FIG. 7 is a graph showing a stress profile of a glass article according to an exemplary embodiment.

FIG. 7 is a graph showing a stress profile of a glass article according to an exemplary embodiment. In the graph of FIG. 7, an X-axis represents the thickness direction of the glass article 100. In FIG. 7, the compressive stress has positive values, while the tensile stress has negative values. Herein, the magnitude of the compressive/tensile stress means the magnitude of an absolute value of stress regardless of its sign or type.

Referring to FIG. 7, an exemplary embodiment of the glass article 100 includes a first compressive region CSR1 extending (or expanding) from the first surface US to a point at a first compression depth DOL1 from the first surface, and a second compressive region CSR2 extending (or expanding) from the second surface RS to a point at a second compression depth DOL2 from the second surface RS. The tensile region CTR is disposed between the first compression depth DOL1 and the second compression depth DOL2. The overall stress profile in the glass article 100 may be symmetrical between both regions of the surfaces US and RS with respect to an imaginary central line in the direction of the thickness t. Although not shown in FIG. 7, in such an embodiment, a compressive region and a tensile region may be disposed between opposed side surfaces of the glass article 100.

The first compressive region CSR1 and the second compressive region CSR2 are resistant to an external impact to prevent the occurrence of cracks or breakage of the glass article 100. As the maximum compressive stresses CS1 and CS2 of the first compressive region CSR1 and the second compressive region CSR2 become larger, the strength of the glass article 100 generally increases. Since an external impact is usually transmitted through the surface of the glass article 100, it is desired to have the maximum compressive stresses CS1 and CS2 at the surface of the glass article 100 in terms of durability. Accordingly, in an exemplary embodiment, the compressive stress of the first compressive region CSR1 and the second compressive region CSR2 may be the largest at the surface and generally decrease toward the inside.

The first compression depth DOL1 and the second compression depth DOL2 suppress cracks or grooves formed in the first surface US and the second surface RS from propagating to the tensile region CTR inside the glass article 100. As the first compression depth DOL1 and the second compression depth DOL2 are larger, it is possible to more efficiently prevent propagation of cracks and the like. The point corresponding to the first compression depth DOC1 and the second compression depth DOC2 corresponds to a boundary between the compressive regions CSR1 and CSR2 and the tension region CTR, and has a stress value of zero.

Throughout the glass article 100, the tensile stress of the tensile region CTR may be balanced with the compressive stress of the compressive regions CSR1 and CSR2. That is, the total compressive stress (i.e., the compressive energy) in the glass article 100 may be the same as the total tensile stress (i.e., the tensile energy) in the glass article 100. The stress energy accumulated in one region having a constant width in the thickness t direction in the glass article 100 may be calculated as an integrated value of the stress profile. The following relational expression may be obtained in a case where the stress profile in the glass article 100 having a thickness t is represented as a function f(x).

$$\int_0^t f(x)dx = 0 \qquad \text{[Mathematical Expression 1]}$$

The greater the magnitude of the tensile stress in the glass article 100, the more likely the fragments are to be vigorously released when the glass article 100 is broken, and the more likely the glass article 100 is to be broken from the inside. The maximum tensile stress that meets a frangibility standard of the glass article 100 may satisfy, but not limited to, the following relationship:

$$CT_1 \leq -38.7 \times \ln(t) + 48.2 \qquad \text{[Mathematical Expression 2]}$$

In one exemplary embodiment, the maximum tensile stress CT1 may be about 80 megapascal (MPa) or less, e.g., about 45 MPa or less. The maximum tensile stress CT1 of about 60 MPa or greater may be desirable to improve mechanical properties such as strength. In an exemplary embodiment, the maximum tensile stress CT1 may be greater than or equal to about 65 MPa and less than or equal to about 75 MPa, but not being limited thereto.

The maximum tensile stress CT1 of the glass article 100 may be generally located at a central portion in the thickness t direction of the glass article 100. For example, the maximum tensile stress CT1 of the glass article 100 may be located at a depth in a range of about 0.4 t to about 0.6 t, or in a range of about 0.45 t to about 0.55 t, or at a depth of about 0.5 t. Here, t denotes the thickness of the glass article 100.

In an exemplary embodiment, the compressive stress and the compression depths DOC1 and DOC2 may have large values to increase the strength of the glass article 100. However, as the compressive energy increases, the tensile energy also increases, and the maximum tensile stress CT1 may increase. Accordingly, in such an embodiment, it is desirable to adjust the stress profile in a way such that the maximum compressive stresses CS1 and CS2 and the compression depths DOL1 and DOL2 have large values while the compressive energy becomes smaller to meet the fragility requirements while having high strength. Accordingly, in an exemplary embodiment, each of the first compressive region CSR1 and the second compressive region CSR2 may include a first transition point TP1 and a second transition point TP2 at which the slope of the stress profile changes abruptly. The shape of the stress profile (particularly, the shape of the stress profile in the compressive region) may be precisely controlled by adjusting the process conditions of the primary ion exchange process and the secondary ion exchange process.

Hereinafter, the stress profile of the compressive region will be described in detail with reference to FIGS. 6 and 7. For convenience of description, the stress profile of the first compressive region CSR1 will be mainly described in detail, since the first compressive region CSR1 and the second compressive region CSR2 are symmetrical with each other in the stress profile, and any repetitive detailed description of the stress profile of the second compressive region CSR2 will be omitted or simplified.

Figure 8:
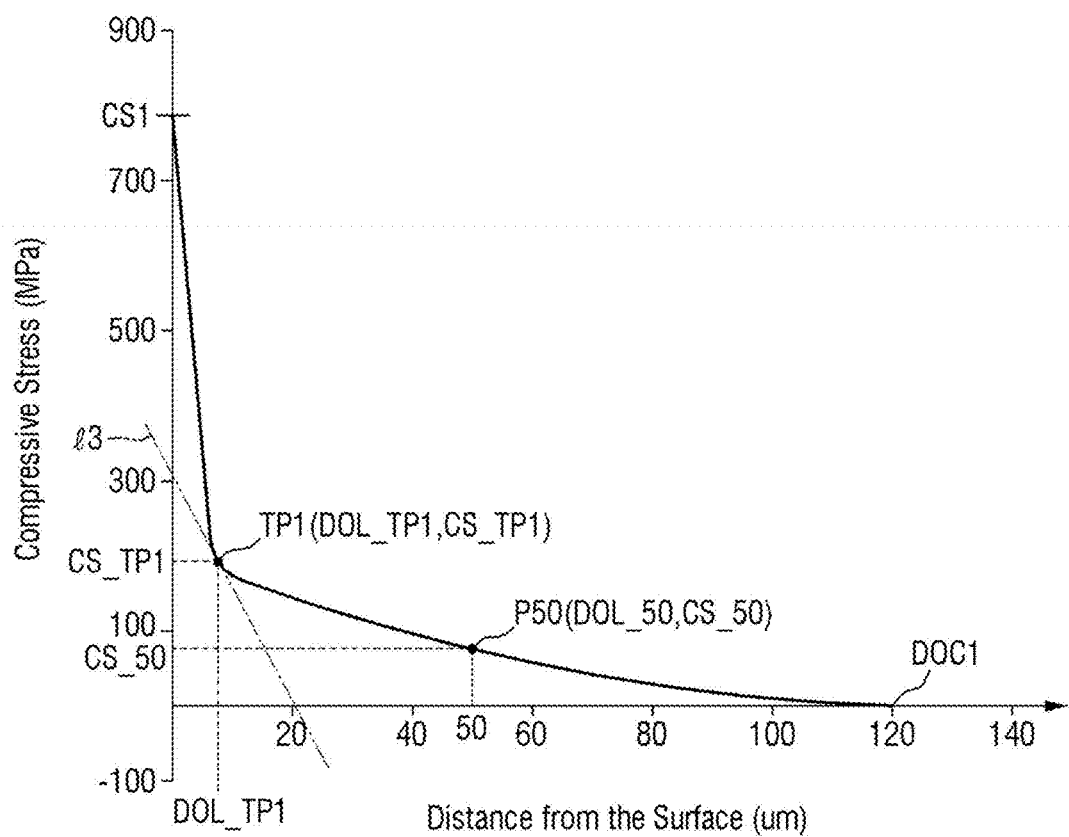
FIG. 8 is an enlarged graph of the vicinity of the first compressive region of FIG. 7.
Figure 9:
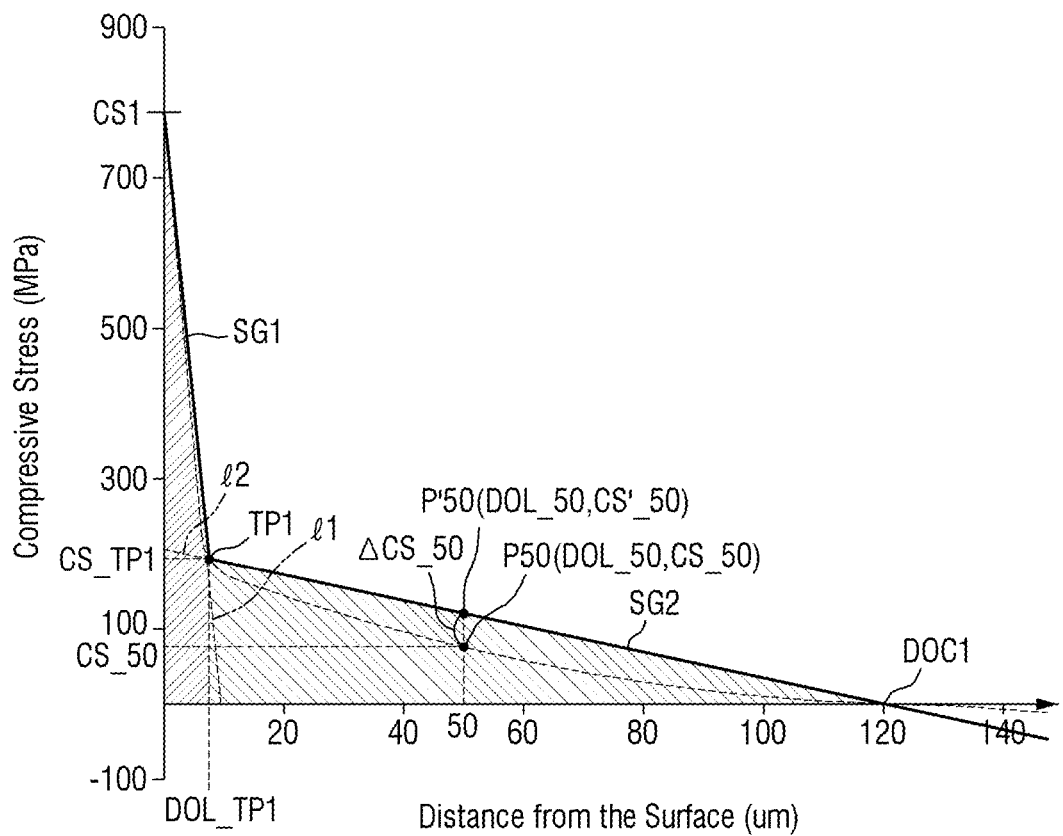
FIG. 9 is a diagram schematically showing a linear graph to which the stress profile of FIG. 8 approximates.

FIG. 8 is an enlarged graph of the vicinity of the first compressive region of FIG. 7. FIG. 9 is a diagram schematically showing a linear graph to which the stress profile of FIG. 8 approximates.

Referring to FIGS. 8 and 9, the stress profile in the first compressive region CSR1 has a negative slope and generally decreases as it goes from the first surface US to the first compression depth DOC1. The stress profile in the first compressive region CSR1 includes at least one first transition point TP1 (or inflection point) at which the slope changes abruptly.

The first transition point TP1 is located between the first surface US and the first compression depth DOC1. The stress profile may be divided into a first segment SG1 and a second segment SG2 based on the first transition point TP1. That is, the stress profile may include the first segment SG1 extending from the first surface US to the first transition point TP1 and the second segment SG2 extending from the first transition point TP1 to the first compression depth DOC1.

As shown in FIG. 9, the first segment SG1 and the second segment SG2 may be divided by the type of ions penetrated. In one exemplary embodiment, for example, potassium ions may penetrate only into a depth section (or a point at a certain depth) of the first segment SG1 located relatively near to the first surface US, and may not substantially penetrate into a depth section of the second segment SG2 located relatively inward in the first compressive region CSR1. In such an embodiment, sodium ions having a smaller ion size than potassium ions may penetrate into not only the depth section of the first segment SG1 but also the depth section of the second segment SG2.

The stress of the first segment SG1 located relatively near to the first surface US in the first compressive region CSR1 may be mainly determined by the density of potassium ions. In such an embodiment, as described above, the section of the first segment SG1 may further include sodium ions, but the stress of the corresponding section may be mainly dependent on the density of potassium ions having a larger ion size. In the depth section of the first segment SG1, the greater the density of potassium ions is, the higher the stress become, and the stress profile may substantially approximate to the density profile of potassium ions. The first transition point TP1 may correspond to the maximum penetration depth of potassium ions.

The stress of the second segment SG2 located inward relative to the first compressive region CSR1 may be mainly determined by the density of sodium ions. That is, in the depth section of the second segment SG2, the greater the density of sodium ions is, the higher the stress become, and the stress profile may substantially approximate to the density profile of sodium ions. The first compression depth DOC1 may substantially correspond to the maximum penetration depth of sodium ions.

The first segment SG1 may substantially approximate to a first straight line 11 connecting the coordinates of the first transition point TP1 and the coordinates of the first surface US in the corresponding section. The first straight line 11 may be expressed as a first function in Mathematical Expression 3 below in a coordinate plane with an X-axis indicating depth and a Y-axis indicating stress:

$$y=m_1x+a \qquad \text{[Mathematical Expression 3]}$$

In Mathematical Expression 3, $m_1$ denotes a first slope of the first straight line 11, and a is a y-intercept, which represents the compressive stress at the first surface US.

The second segment SG2 may substantially approximate to a second straight line 12 connecting the coordinates of the first transition point TP1 and the coordinates of the first compression depth DOC1 having a stress value of zero in the corresponding section. The second straight line 12 may be expressed as a second function in Mathematical Expression 4 below in a coordinate plane with an X-axis indicating depth and a Y-axis indicating stress:

$$y=m_2x+b \qquad \text{[Mathematical Expression 4]}$$

In Mathematical Expression 4, $m_2$ denotes an average slope of the second segment SG2, which is a second slope of the second straight line 12, b denotes a y-intercept, and $-b/m_2$ is an x-intercept, which represents the first compression depth DOC1.

Some sections of the tensile region CTR adjacent to the first compressive region CSR1 may have a stress profile in conformity with the second straight line 12.

In the above functions, each of the first slope $m_1$ and the second slope $m_2$ has a negative value, and the absolute value of the first slope $m_1$ of the first straight line 11 is greater than the absolute value of the second slope $m_2$ of the second straight line 12. The first segment SG1 may substantially have the first slope $m_1$, and the second segment SG2 may substantially have the second slope $m_2$.

The slope (or gradient) of the stress profile changes abruptly at the first transition point TP1. The first transition point TP1 is located at a point where the first straight line 11 and the second straight line 12 meet each other, but the second segment SG2 and the first segment SG1 in the actual stress profile have an inflection point around the first transition point TP1 at which the actual stress profile is curved. The stress profile may have a third slope $m_3$ at the first transition point TP1, and the third slope $m_3$ may be calculated as a slope of a tangent line 13 of the stress profile at the first transition point TP1. The third slope $m_3$ may approximate to a slope of a straight line connecting one point of the first segment SG1 adjacent to the first transition point TP1 and one point of the second segment SG2. The tangent line 13 at the first transition point TP1 may be expressed as a third function in Mathematical Expression 5 below:

$$y=m_3x+C \qquad \text{[Mathematical Expression 5]}$$

The third slope $m_3$ has a negative value, and the absolute value of the third slope $m_3$ may be less than the absolute value of the first slope $m_1$ and greater than the absolute value of the second slope $m_2$.

In an exemplary embodiment, the absolute value of the third slope $m_3$ of the third function may be in a range of about 9 MPa/μm to about 12 MPa/μm. In an alternative exemplary embodiment, the absolute value of the third slope $m_3$ of the third function may be in a range of about 10 MPa/μm to about 11 MPa/μm. In an exemplary embodiment, the y-intercept of the third function may be in a range of about 270 MPa to about 300 MPa. In one exemplary embodiment, for example, $m_3$ may be about −10.249 MPa/μm and c may be about 292.5 MPa. When the third slope $m_3$ and y-intercept of the third function are in the above-mentioned ranges, respectively, the magnitude of compressive energy and a stress-depth ratio CDR of the first transition point TP1 may be within desired ranges to be described later.

In an exemplary embodiment, the first segment SG1 and the second segment SG2 having different slopes from each other may be generated by a plurality of ion exchange processes. The second segment SG2 may be generated through the primary ion exchange process, and the first segment SG1 may be generated through the secondary ion exchange process.

In such an embodiment, the primary ion exchange process is a process of imparting the compression depths DOC1 and DOC2 to the glass, and may be performed generally by exposing the glass to single molten salt containing sodium ions or mixed molten salt containing potassium ions and sodium ions. In one exemplary embodiment, for example, for the primary ion exchange process, the glass is immersed in a first bath 51 (see FIG. 5) containing single molten salt containing sodium nitrate or mixed molten salt in which potassium nitrate and sodium nitrate are mixed. In an alternative exemplary embodiment where the mixed molten salt is used, the contents of potassium nitrate and sodium nitrate in the first bath may be similar to each other. In one exemplary embodiment, for example, the salt ratio of potassium nitrate to sodium nitrate may be adjusted in the range of about 40:60 to about 60:40. In an exemplary embodiment, the salt ratio of potassium nitrate to sodium nitrate in the mixed molten salt of the primary ion exchange process may be about 50:50, but not being limited thereto.

The primary ion exchange process may be performed at a temperature in a range of ±20° C. from a temperature 50° C. lower than the glass transition temperature. In one exemplary embodiment, for example, where the glass transition temperature is about 580° C., the primary ion exchange process may be performed at a temperature of about 500° C. or higher. The primary ion exchange process time may be in a range from 3 hours to 8 hours, but not being limited thereto.

Through the primary ion exchange process, lithium ions/sodium ions which are small ions inside the glass are exchanged with sodium ions/potassium ions which are larger ions than lithium ions/sodium ions in the molten salt, thereby increasing the concentration of sodium ions and/or potassium ions in the glass. Since the molten salt is provided with lithium ions from the glass, the molten salt of the first bath after the primary ion exchange process may further include lithium ions in addition to sodium ions and potassium ions.

After the primary ion exchange process and before the secondary ion exchange process, a stress relieving process (or an annealing process) may be further performed. The stress relieving process may be performed at a temperature of about 500° C. or higher for 1 hour to 3 hours. The stress relieving process may reduce the maximum compressive stress and allow the diffusion of sodium ions (and/or potassium ions) into the glass to increase the compressive depth. The stress relieving process may be performed in air or liquid. Alternatively, the stress relieving process may be omitted.

Upon completion of the primary ion exchange process (if a stress relieving process is additionally performed, when the stress relieving process is completed), a stress profile corresponding to the second straight line l2 is generated in the glass article 100. That is, sodium ions and/or potassium ions of the mixed molten salt are exchanged to penetrate into the glass, and then diffuse in the depth direction. Sodium ions generally diffuse to the first compression depth DOC1 to form the first compressive region CSR1 having a compressive stress from the first surface US to the first compressive depth DOC1. That is, the first compression depth DOC1 is determined by the primary ion exchange process and/or the stress relieving process.

The density of diffusing ions is substantially inversely proportional to the diffusion distance. Since sodium ions and potassium ions enter the glass through ion exchange from the surface of the glass and diffuse in the depth direction, the concentration of sodium ions and potassium ions tends to substantially linearly decrease as it goes away from the first surface US of the glass. As a result, the stress profile has the largest stress CS1_1 at the first surface US1 of the glass and decreases in the depth direction in the same manner as the second straight line l2.

In addition, the degree of diffusion of ions is inversely proportional to the size of ions. In other words, as the size of ions is smaller, more ions diffuse. Therefore, when both sodium ions and potassium ions penetrate into the glass through the first ion exchange process, sodium ions having a relatively small size may diffuse more readily and penetrate deeper into the glass article 100. Sodium ions may diffuse to the first compression depth DOC1, while potassium ions may diffuse only to a depth less than or equal to the first transition point TP1.

In such an embodiment, as described above, the first compression depth DOC1 has a close correlation with the maximum diffusion depth of sodium ions, which are smaller ions that are ion-exchanged. The first compression depth DOC1 may be the same as the maximum diffusion depth of sodium ions, or may be located in the vicinity thereof even though there is a slight difference, and may be generally proportional to the maximum diffusion depth of sodium ions. As described above, the primary ion exchange process and/or the stress relieving process is a process of forming a predetermined first compression depth DOC1 through sufficient diffusion, and is performed for a sufficiently long time to allow ions to be sufficiently diffused.

In such an embodiment, as more ion diffusion is performed, the maximum compressive stress CS1 may become smaller. The maximum compressive stress CS1 increases as the density of ions increases. Thus, if a same amount of ions enter into the glass, the more the diffusion become, the smaller the density of ions and the smaller the compressive stress become. As described above, since the primary ion exchange process has limitations to increasing the maximum compressive stress CS1 of the first surface US, the secondary ion exchange process is further performed after the primary ion exchange process to form a greater surface compressive stress CS1.

The secondary ion exchange process is a process of increasing the maximum compressive stress CS1, and is generally performed by exposing the glass to single molten salt containing potassium ions or mixed molten salt containing potassium ions and sodium ions. In one exemplary embodiment, for example, for the secondary ion exchange process, the glass that has undergone the primary ion exchange process is immersed in the second bath 52 (see FIG. 5) containing single molten salt containing potassium nitrate or mixed molten salt in which potassium nitrate and sodium nitrate are mixed. Even when the mixed molten salt is used, a salt ratio is adjusted such that main ions penetrating into the glass are potassium ions. That is, the content of potassium nitrate in the second bath is greater than that in the primary ion exchange process, and furthermore, the concentration of potassium nitrate may be greater than that of sodium nitrate. In one exemplary embodiment, for example, the salt ratio of potassium nitrate to sodium nitrate in the second bath may be adjusted to be in a range of about 80:20 to about 98:2. In an exemplary embodiment, the salt ratio of potassium nitrate to sodium nitrate in the mixed molten salt of the secondary ion exchange process may be about 92:8, but not being limited thereto.

The secondary ion exchange process may be performed at a lower temperature and for a shorter time than the primary ion exchange process. In one exemplary embodiment, for example, the secondary ion exchange process may be performed for 1 hour to 3 hours, or 1.3 hours to 2 hours in a temperature range of about 380° C. to about 460° C.

Through the secondary ion exchange process, the compressive stress in a shallow depth section of the glass surface US is substantially increased. In an exemplary embodiment, where potassium ions penetrate into the glass, the compressive stress in the corresponding portion becomes larger due to the potassium ions having a larger size. Potassium ions which penetrate into the glass diffuse in the depth direction. Compared with the primary ion exchange process, potassium ions have a slower diffusion rate than sodium ions, and the duration of the secondary ion exchange process is shorter than that of the primary ion exchange process. Accordingly, the diffusion depth of potassium ions diffused through the secondary ion exchange process may be much less than that in the first compression depth DOC1. The maximum diffusion depth of potassium ions may be equal to or less than the first transition point TP1, as described above.

The stress profile formed by the potassium ions additionally penetrated through the secondary ion exchange process has substantially the same shape as in the first straight line l1. The compressive stress CS1 of the first surface US is increased through the secondary ion exchange process, while the penetration depth (or the first transition point TP1) of the potassium ions is less than the first compressive depth DOC1. Thus, the absolute value of the first slope $m_1$ of the first straight line l1 is greater than the absolute value of the second slope $m_2$ of the second straight line l2. That is, the compressive stress profile may have a slope which is steep in the vicinity of the surface of the glass article 100, and becomes gentler toward the interior of the glass article 100.

The stress profile in the first compressive region CSR1 as described above may have at least three main feature points. A first feature point corresponds to the y-intercept of the second straight line l2 and is located on the first surface US. A second feature point corresponds to the x-intercept of the first straight line l1, and corresponds to the first compression depth DOC1. A third feature point is located at the first transition point TP1. The position of the feature point is a factor that substantially determines the stress profile. Since the stress profile between the first feature point and the third feature point approximates to the first straight line l1, and the stress profile between the second feature point and the third feature point approximates to the second straight line l2, when the first feature point, the second feature point and the third feature point are determined, the shape of the stress profile may also be determined.

The first feature point is a point located on the first surface US, and has an x-coordinate value of 0 and a y-coordinate value which corresponds to the maximum compressive stress CS1. The maximum compressive stress CS1 expressed by the first feature point is associated with the strength of the glass article 100. In an exemplary embodiment, the occurrence of cracks due to external impacts may be effectively prevented by increasing the maximum compressive stress CS1. The maximum compressive stress CS1 is mainly determined by the amount of potassium ions exchanged in the secondary ion exchange process, and may have a certain relationship with the degree of diffusion after ion exchange.

In an exemplary embodiment, the maximum compressive stress CS1 may be about 300 MPa or greater. In exemplary embodiments, for example, the maximum compressive stress CS1 may be about 350 MPa or greater, about 400 MPa or greater, about 450 MPa or greater, or about 500 MPa or greater. In addition, the maximum compressive stress CS1 may be about 2000 MPa or less. In such embodiments, the maximum compressive stress CS1 may be about 1800 MPa or less, about 1500 MPa or less, or about 1050 MPa or less. In one exemplary embodiment, for example, the maximum compressive stress CS1 may be in a range of about 780 MPa to about 820 MPa.

The second feature point is a point where the stress value is 0, and has a y-coordinate value of 0 and an x-coordinate value which corresponds to the first compression depth DOC1. The first compression depth DOC1 represented by the second feature point corresponds to the size (or width) of the first compressive region CSR1 of the glass article 100. In an exemplary embodiment, cracks may be effectively prevented from propagating to the tensile region CTR by increasing the first compression depth DOC1. Accordingly, in an exemplary embodiment, the first compression depth DOC1 (i.e., the distance from the first surface US to the first compression depth DOC1) may be about 50 micrometers (μm) or greater, about 65 μm or greater, about 80 μm or greater, or about 95 μm or greater. However, if the first compression depth DOC1 is excessively large, the compressive energy and the tensile energy may become excessively great, which may cause failure in satisfying a frangibility standard. Accordingly, in an exemplary embodiment, the first compression depth DOC1 may be about 250 μm or less, about 200 μm or less, about 180 μm or less, about 150 μm or less, or about 135 μm or less. In one exemplary embodiment, for example, the first compression depth DOC1 may be in a range of about 110 μm to about 120 μm.

The first compression depth DOC1 may be controlled mainly by the temperature and time duration of the primary ion exchange process and/or the stress relieving process.

In an exemplary embodiment, the first compression depth DOC1 may be about 0.1 t or greater, about 0.15 t or greater, or about 0.18 t or greater, where the thickness of the glass is t. In such an embodiment, the first compression depth DOC1 may be about 0.25 t or less, about 0.23 t or less, or about 0.2 t or less, where the thickness of the glass is t.

The third feature point is located at a predetermined depth and has a predetermined stress value. The first transition point TP1 represented by the third feature point is mainly associated with the first slope $m_1$ of the first segment SG1 and the second slope $m_2$ of the second segment SG2. The first slope $m_1$ may be determined by process conditions of the primary ion exchange process and the stress relieving process, and the second slope $m_2$ may be determined by process conditions of the secondary ion exchange process.

The x-coordinate value (depth) of the first transition point TP1 has a value between 0 and the first compression depth DOC1, and the y-coordinate value (stress) of the first transition point TP1 has a value between 0 and the maximum compressive stress. According to the example of the first compression depth DOC1 and the maximum compressive stress CS1 as described above, the depth of the first transition point TP1 may be in a range of about 0 μm to about 9.0 μm, and the stress of the first transition point TP1 may be in a range of about 0 MPa to about 220 MPa. The position of the first transition point TP1 determines the substantial shape of the stress profile in the first compressive region CSR1. In addition, the position of the first transition point TP1 determines the area of the first compressive region CSR1, i.e., the magnitude of the compression energy.

If a depth DOL_TP1 of the first transition point TP1 is excessively large, the production cost may increase, the magnitude of compressive energy may be excessively large, or mechanical properties such as strength may be degraded. If the depth DOL_TP1 of the first transition point TP1 is excessively small, a section capable of efficiently preventing the propagation of cracks due to a strong impact may be reduced. In view of the above, the depth DOL_TP1 of the first transition point TP1 may be in the range of about 8.1 μm to about 9.5 μm.

The ratio of the depth DOL_TP1 of the first transition point TP1 to the first compression depth DOC1 may be in a range of about 0.065 to about 0.095, or in a range of about 0.07 to about 0.08. The depth DOL_TP1 of the first transition point TP1 may be in the range of about 0.010 t to about 0.015 t or in the range of about 0.011 t to about 0.014 t with respect to the thickness t of the glass.

The stress CS_TP1 of the first transition point TP1 may be about 150 MPa or greater, about 180 MPa or greater, or about 197 MPa or greater. In addition, the stress CS_TP1 of the first transition point TP1 may be about 250 MPa or less, about 230 MPa or less, or about 207 MPa or less. If the stress CS_TP1 of the first transition point TP1 is excessively great, the compressive energy increases or the depth of the first transition point TP1 becomes small, such that the propagation of cracks may not be effectively prevented. If the stress CS_TP1 of the first transition point TP1 is excessively little, the strength may become excessively small. Accordingly, in an exemplary embodiment, the stress CS_TP1 of the first transition point TP1 may be in a range of about 150 MPa to about 250 MPa. In such an embodiment, the stress CS_TP1 of the first transition point TP1 may be in a range of about 180 MPa to about 230 MPa. In such an embodiment, the stress CS_TP1 of the first transition point TP1 may be in a range of about 197 MPa to about 207 MPa. The stress CS_TP1 of the first transition point TP1 may be in a range of about 0.220 times to about 0.260 times the maximum compressive stress CS1, or in a range of about 0.230 times to about 0.255 times the maximum compressive stress CS1.

In addition to the depth DOL_TP1 and the stress CS_TP1 of the first transition point TP1, the ratio of the stress CS_TP1 to the depth DOL_TP1 (hereinafter, referred to as a stress-depth ratio CDR) of the first transition point TP1 is a major factor in determining a proportion of the compressive energy (i.e., a value obtained by integrating each segment) of each segment SG1, SG2 in the stress profile.

As shown in FIG. 8, the stress profile has a crack prevention stress CS_50 at a crack prevention point P50. In an exemplary embodiment, the crack prevention point P50 may be a point located at a depth of about 50 μm from the glass surface US, and the crack prevention stress CS_50 has a significant influence on a critical drop height of the glass in a model drop experiment of Experimental Example 3 to be described later. As an experimental result, the depth of a crack which occurred in each sample of the model drop experiment of Experimental Example 3 had a median of about 50 μm. Such an influence of the crack prevention stress CS_50 on the critical drop height will be described later in greater detail with reference to the model drop experiment of Experimental Example 3.

The crack prevention stress CS_50 of the crack prevention point P50 may have a value greater than zero and less than the stress CS_TP1 of the first transition point TP1, but not being limited thereto. In an exemplary embodiment, the crack prevention stress CS_50 may have a value of about 55 MPa or greater, about 65 MPa or greater, or about 75 MPa or greater. In such an embodiment, the crack prevention stress CS_50 may be about 100 MPa or less, about 90 MPa or less, or about 80 MPa or less. In one exemplary embodiment, for example, the crack prevention stress CS_50 may have a value in a range of about 55 MPa to about 100 MPa. In such an embodiment, the crack prevention stress CS_50 may have a value in a range of about 65 MPa to about 90 MPa. In such an embodiment, the crack prevention stress CS_50 may have a value in a range of 75 MPa to 80 MPa, but not being limited thereto.

The stress profile shown in FIG. 9 may have an approximate crack prevention point P'50, located at a depth of 50 μm (DOL_50) from the glass surface US, on the second straight line l2 connecting the coordinates of the first transition point TP1 and the coordinates of the first compression depth DOC1 of the second segment SG2. The stress at the approximate crack prevention point P'50 may be an approximate crack prevention stress CS'_50. The approximate crack prevention stress CS'_50 may have a value greater than the crack prevention stress CS_50 and less than the stress CS_TP1 of the first transition point TP1. In an exemplary embodiment, the approximate crack prevention stress CS'_50 may have a value in a range of about 80 MPa to about 170 MPa. In one embodiment, for example, the approximate crack prevention stress CS'_50 may have a value in a range of about 100 MPa to about 150 MPa. In one exemplary embodiment, for example, the approximate crack prevention stress CS'_50 may have a value in a range of about 120 MPa to about 130 MPa, but not being limited thereto.

In addition, the stress profile illustrated in FIG. 9 may have a crack prevention stress gap ΔCS_50 defined as a difference between the approximate crack prevention stress CS'_50 and the crack prevention stress CS_50. In an exemplary embodiment, the crack prevention stress gap ΔCS_50 may have a value in a range of about 30 MPa to about 70 MPa. In one exemplary embodiment, for example, the crack prevention stress gap ΔCS_50 may have a value in a range of about 40 MPa to about 60 MPa. In one exemplary embodiment, for example, the crack prevention stress gap ΔCS_50 may have a value in the range of about 45 MPa to about 55 MPa, but not being limited thereto.

Figure 10:
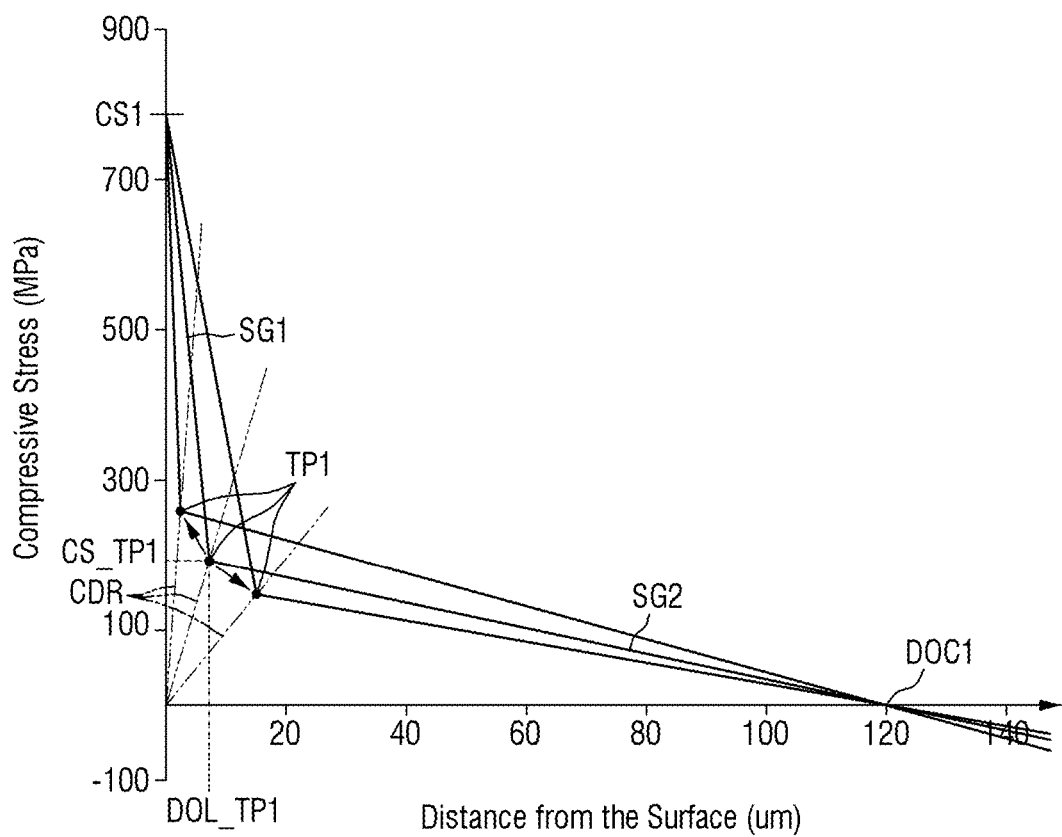
FIG. 10 is a schematic diagram showing stress profiles according to various stress-depth ratios of the first transition point.

FIG. 10 is a schematic diagram showing stress profiles according to various stress-depth ratios of the first transition point.

Referring to FIGS. 8, 9 and 10, as the stress-depth ratio CDR of the first transition point TP1 increases, the depth DOL_TP1 of the first transition point TP1 decreases relatively and the stress CS_TP1 of the first transition point TP1 increases relatively. Further, as the stress-depth ratio CDR of the first transition point TP1 increases, first compressive energy (or surface compressive energy) of the first segment SG1 decreases relatively, but second compressive energy (or internal compressive energy) of the second segment SG2 increases relatively. On the other hand, when the stress-depth ratio CDR of the first transition point TP1 decreases, the opposite tendency is exhibited.

According to the experimental findings shown in FIG. 10, when the depth DOL_TP1 of the first transition point TP1 is in a range of about 8.0 μm to about 9.0 μm, the stress CS_TP1 of the first transition point TP1 is in a range of about 180 MPa to about 210 MPa, as the stress-depth ratio CDR of the first transition point TP1 increases, the mechanical properties such as strength are improved. If the stress-depth ratio CDR of the first transition point TP1 is about 20 MPa/μm or greater, a significant strength improvement effect may be exhibited in a glass impact test ("GIT"). On the other hand, when the stress-depth ratio CDR of the first transition point TP1 is excessively large, the depth DOL_TP1 of the first transition point TP1 becomes smaller and the section corresponding to the first segment SG1 becomes excessively narrow. Since it is difficult to precisely form the stress profile, there may be a lot of deviation between products. In addition, if the stress-depth ratio CDR of the first transition point TP1 is excessively large, the section capable of efficiently preventing the propagation of cracks due to a strong impact may be reduced, and the second compressive energy may be further increased to excessively increase the overall compressive energy and tensile energy. Accordingly, in an exemplary embodiment, the stress-depth ratio CDR of the first transition point TP1 may be adjusted to be less than or equal to 25 MPa/μm. In an exemplary embodiment, where the stress-depth ratio CDR of the first transition point TP1 is in a range of about 20 MPa/μm to about 25 MPa/μm as described above, the second compressive energy is greater than the first compressive energy and may be about 2 to 5 times or about 3 to 4 times the first compressive energy.

Figure 11:
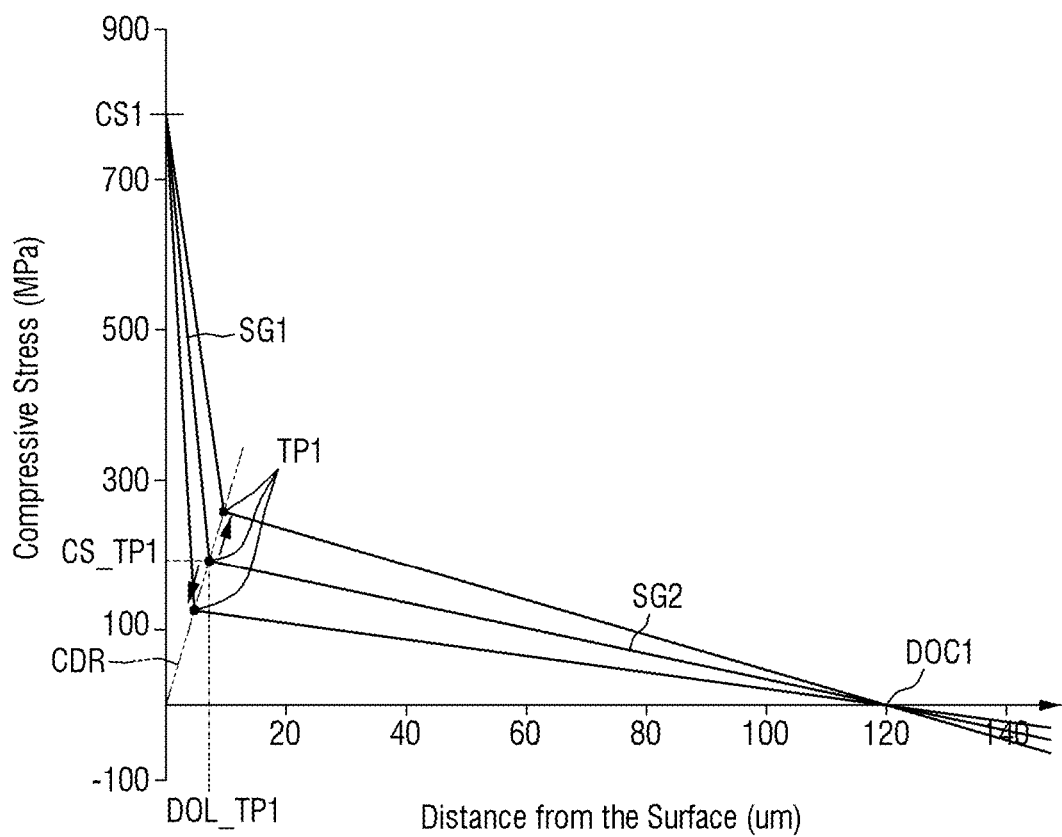
FIG. 11 is a schematic diagram showing stress profiles having various compressive energies at a same stress-depth ratio of the first transition point.

FIG. 11 is a schematic diagram showing stress profiles having various compressive energies at a same stress-depth ratio of the first transition point.

Referring to FIGS. 8 to 11, even in a case where the maximum compressive stress CS1, which is the first feature point, and the first compression depth DOC1, which is the second feature point, are fixed, and the stress-depth ratio CDR of the first transition point TP1 corresponding to the third feature point has a specific value, the compressive energy and the tensile energy may be changed by the actual coordinates of the first transition point TP1. If both the stress CS_TP1 and the depth DOL_TP1 of the first transition point TP1 increase while maintaining the stress-depth ratio CDR, the stress profile is located at a relatively upper part, and thus, the area under the graph increases, such that the compression energy and the tensile energy are increased. A certain increase in compressive energy may improve mechanical properties. When the total compressive energy obtained by adding the first compressive energy and the second compressive energy of the first compressive region CSR1 is about 8,000 joules per square meter ($J/m^2$) or greater, for example, there is an effect of improving mechanical properties in the glass impact test. However, an excessive increase in tensile energy may cause failure in satisfying a frangibility standard of the glass article 100. Accordingly, in an exemplary embodiment, the total compressive energy obtained by adding the first compressive energy and the second compressive energy of the first compressive region CSR1 may have a value of about 12,000 J/m² or less.

With respect to the second compressive energy, the range of the second compressive energy capable of improving the mechanical property and satisfying the frangibility standard may be in a range of about 5,500 J/m² to about 8,500 J/m². In an exemplary embodiment, the second compressive energy may be in a range of about 7,000 J/m² to about 8,000 J/m². In one exemplary embodiment, for example, the second compressive energy may be in a range of about 7,250 J/m² to about 7,750 J/m².

Further, with respect to the first compressive energy, the range of the first compressive energy capable of improving the mechanical property and satisfying the frangibility standard may be in a range of about 3,200 J/m² to about 4,000 J/m². In an exemplary embodiment, the first compressive energy may be in a range of about 3,400 J/m² to about 3,800 J/m². In one exemplary embodiment, for example, the first compressive energy may be in a range of about 3,500 J/m² to about 3,700 J/m².

In an exemplary embodiment, the compressive energy of the first compressive region CSR1, i.e., the sum of the first compressive energy and the second compressive energy may be in a range of about 8,700 J/m² to about 12,500 J/m². In one exemplary embodiment, for example, the compression energy of the first compressive region CSR1 may be in a range of about 10,500 J/m² to about 11,500 J/m².

The tensile energy is the sum of the compressive energy of the first compressive region CSR1 and the compressive energy of the second compressive region CSR2, and is equal to twice the compressive energy of each compressive region. Thus, in consideration of the mechanical property and frangibility standard, the tensile energy may range from 16,000 J/m² to 24,000 J/m².

The compressive stress, the first compressive depth DOC1, the tensile stress, the first transition point TP1 and the like described herein may be measured by a surface stress meter and/or a scattered light photoelastic stress meter.

Specifically, the first segment SG1 associated with the surface compressive stress CS1 and the first transition point TP1 may be measured by a surface stress meter such as FSM-6000 manufactured by Orihara Industrial Co., Ltd. (Japan). The surface stress meter may measure the density of potassium ions in the glass article 100. Therefore, the first segment SG1 of the stress profile may be estimated by measuring the density of potassium ions from the first surface US of the glass article 100 to the first transition point TP1, which is the maximum penetration depth of potassium ions.

The tensile stress may be measured by a scattered light photoelastic stress meter such as SLP-1000 manufactured by Orihara Industrial Co., Ltd. The scattered light photoelastic stress meter can measure the stress inside the glass article 100 using a laser and scattered light photoelastic analysis technology, and is mainly used to measure the tensile stress of the tensile region CTR. The tensile stress is the largest at the center of the glass article 100 and has a stress value of zero when it reaches the first compression depth DOC1. Therefore, a point where the stress value measured by the scattered light photoelastic stress meter is zero may be estimated as the first compression depth DOC1, and the second segment SG2 may be estimated by connection from the first compression depth DOC1 to the first transition point TP1.

However, the method of measuring the stress profile is not limited to the above-mentioned method, but the stress profile may be measured by using at least one of various other apparatuses and methods known in the art.

Hereinafter, exemplary embodiments will be described in greater detail with reference to FIGS. 12 to 16 through Production Example and Experimental Examples.

Figure 12:
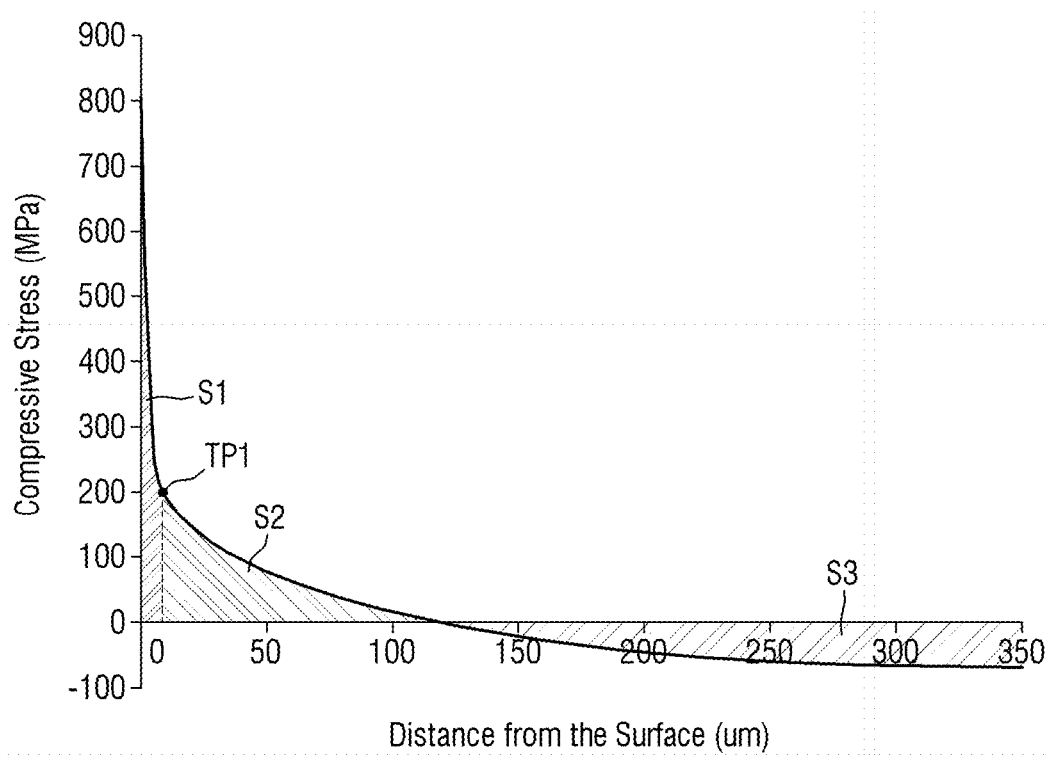
FIG. 12 is a stress profile graph explaining the stress energy for each region.

FIG. 12 is a stress profile graph explaining the stress energy for each region.

Referring to FIG. 12, the area under the stress profile graph may mean the magnitude of the stress energy of the corresponding region. In an exemplary embodiment, the stress energy of the first compressive region CSR1 of glass having a thickness t of about 700 μm includes compressive energy S1 of a section from the first surface US to the first transition point TP1, compressive energy S2 of a section from the first transition point TP1 to the first compression depth DOC1, and tensile energy S3 from the first compression depth DOC1 to a depth of 0.5 t (i.e., about 350 μm). In the stress profile which is symmetrical with respect to the point of 0.5 t (about 350 μm), according to Mathematical Expression 1, the absolute value of the sum of the compression energy S1 of the section from the first surface US to the first transition point TP1 and the compression energy S2 of the section from the first transition point TP1 to the first compression depth DOC1 may be equal to the absolute value of the tensile energy S3 from the first compression depth DOC1 to the depth of 0.5 t (about 350 μm).

Figure 13:
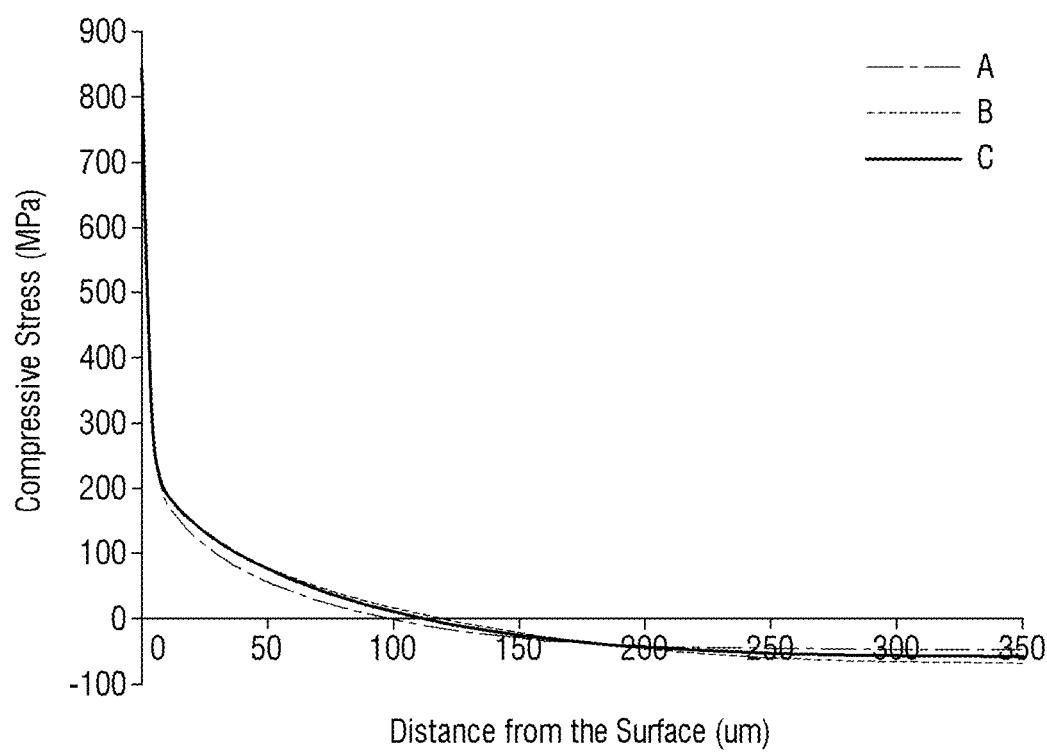
FIG. 13 is a graph showing stress at each position in the thickness direction of Sample Groups A, B and C.
Figure 14:
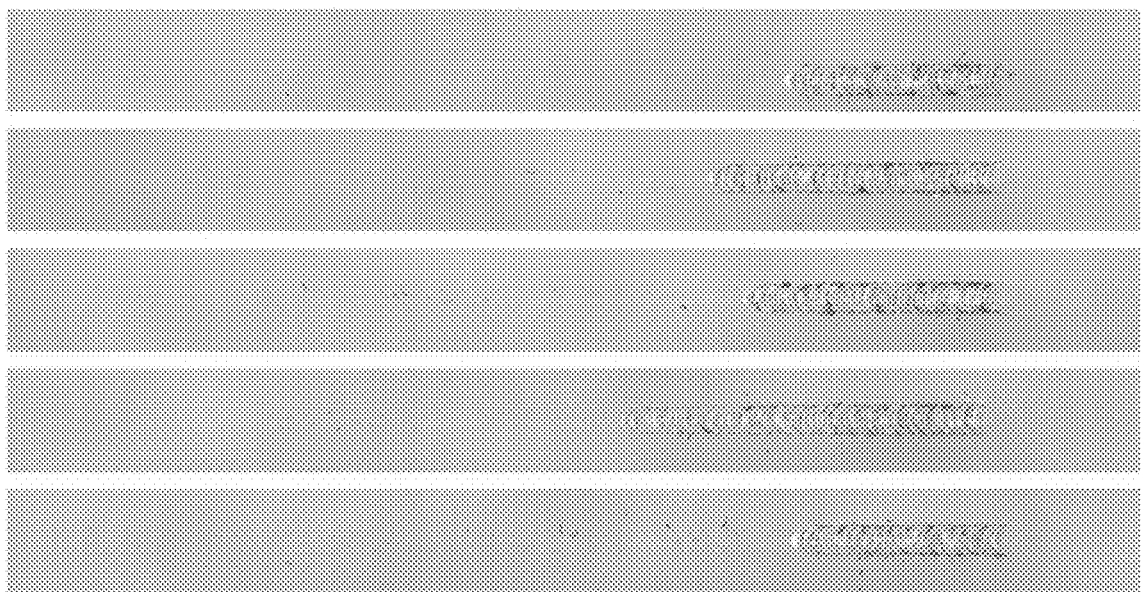
FIG. 14 is a photograph showing the results of a critical scratch load measurement experiment of Sample Group B.
Figure 15:
FIG. 15 is a photograph showing the results of a critical scratch load measurement experiment of Sample Group C.
Figure 16:
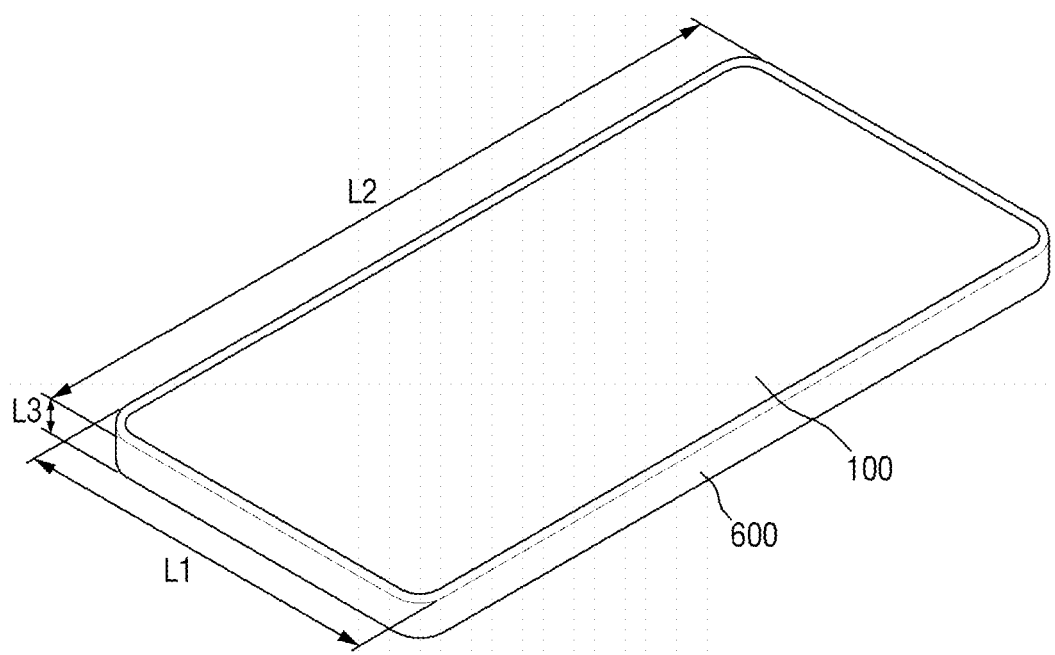
FIG. 16 is a perspective view illustrating a model used for a model drop experiment.

FIG. 13 is a graph showing stress at each position in the thickness direction of Sample Groups A, B and C. FIG. 14 is a photograph showing the results of a critical scratch load measurement experiment of Sample Group B. FIG. 15 is a photograph showing the results of a critical scratch load measurement experiment of Sample Group C. FIG. 16 is a perspective view illustrating a model used for a model drop experiment.

PRODUCTION EXAMPLE: PRODUCTION OF STRENGTHENED GLASS

A plurality of plate-shaped glass substrates having a thickness of about 0.70 millimeter (mm) and having a lithium aluminosilicate composition were prepared, and a chemical strengthening process was performed to produce Sample Groups A, B and C which have similar stress profiles, but have different strain points.

As the chemical strengthening process, a primary ion exchange process was performed on the glass substrates by immersing the glass substrates in a first molten salt bath in which potassium nitrate and sodium nitrate are mixed in a salt ratio of about 50:50, and a secondary ion exchange process was performed by immersing the glass substrates in a second molten salt bath in which potassium nitrate and sodium nitrate are mixed in a salt ratio of about 98:2. For comparison of strengths according to stress profiles, the ion exchange process was performed on each sample group in a different bath such that each sample group has a different stress profile, controlling temperature and time of the ion exchange process. The process conditions were adjusted such that the maximum compressive stress of each sample group corresponds to about 810 MPa±40 MPa.

With respect to the glass substrates on which the strengthening process has been completed, the stress at each position in the thickness direction, compression depth and energy were measured by FSM-6000 and SLP-1000, and the results are shown in Table 1 below and shown in FIG. 13.

TABLE 1

| Sample Group | A | B | C |
| --- | --- | --- | --- |
| Maximum compressive stress (MPa) | 772.1 | 807.1 | 840.5 |
| Compressive stress (MPa) at transition point | 189.5 | 202.3 | 196.5 |
| Compressive stress (MPa) at depth of 50 μm | 57.3 | 78.3 | 75.2 |
| Maximum tensile stress (MPa) | −46.7 | −68.1 | −58.5 |
| Transition point depth (μm) | 8.3 | 8.8 | 8.5 |
| First compression depth (μm) | 97.9 | 118.3 | 109.9 |
| Stress-depth ratio (MPa/μm) at transition point | 22.83 | 22.99 | 23.12 |
| Compressive energy (J/m$^2$) of first surface-transition point section | 3262 | 3606 | 3460 |
| Compressive energy (J/m$^2$) of transition point-first compression depth section | 5598 | 7453 | 7067 |
| Tensile energy (J/m$^2$) of first compression depth-0.5t section | −9562 | −11405 | −10530 |
| Strain point (° C.) | 530 | 535 | 501 |
| Hardness (GPa) | 7.904 | 8.082 | 8.159 |

In addition, a tangent line equation at the transition point of each sample group was calculated as follows.

TABLE 2

| Sample Group | Tangent line equation at transition point |
| --- | --- |
| A | y = −10.983x + 280.66 |
| B | y = −10.249x + 292.5 |
| C | y = −9.800x + 279.8 |

The strain point of the glass was measured using thermomechanical analysis ("TMA") of measuring a change in size of the sample as a function of temperature by applying a load while varying the temperature of the sample and differential thermal analysis ("DTA") of measuring a temperature difference between the sample and a reference material as a function of temperature while varying the temperature of the sample and the reference material.

Sample Group A exhibited values of 525° C. to 535° C. (e.g., about 530° C.) at strain points measured with 100 samples. Sample Group B exhibited values of 530° C. to 540° C. (e.g., about 535° C.) at strain points measured with 100 samples. Sample Group C exhibited values of 496° C. to 506° C. (e.g., about 501° C.) at strain points measured with 100 samples.

The hardness H of the glass may be obtained through the following equation by applying a load P to the sample with a triangular pyramid-shaped Berkovich tip using a nano indenter and measuring a triangular indentation area A. In an exemplary embodiment, the load P may be about 1 newton (N) and the distance from the center of the Berkovich tip to the vertex may be about 20 nanometers (nm).

$$H = \frac{P}{A}$$ [Mathematical Expression 6]

In the hardness measurement evaluation, an average value of hardness of 7.904 GPa was measured in Sample Group A, an average value of hardness of 8.082 GPa was measured in Sample Group B, and an average value of hardness of 8.159 GPa was measured in Sample Group C. The tendency of hardness was substantially consistent with the tendency of maximum compressive stress. Sample Group C with the highest maximum compressive stress exhibited the highest hardness, and Sample Group A with the lowest maximum compressive stress exhibited the lowest hardness.

Experimental Example 1: Critical Scratch Load Evaluation

Critical scratch load evaluation was performed. A critical scratch load is a measure to evaluate the scratch resistance. The critical scratch load refers to a load at which a scratch begins to occur when increasing a load from about 0 N to about 15 N on an about 2 mm long region of the sample with a pyramidal diamond tip having a diagonal length of about 19 μm by using a Vickers hardness tester. Table 3 shows the average value of the critical scratch load for each sample group.

TABLE 3

| Sample Group | Critical Scratch Load (N) |
| --- | --- |
| A | 9.3 |
| B | 9.9 |
| C | 6.1 |

Referring to Table 3, in the critical scratch load evaluation, an average value of critical scratch load of 9.3 N was measured in Sample Group A, an average value of critical scratch load of 9.9 N was measured in Sample Group B, and an average value of critical scratch load of 6.1 N was measured in Sample Group C. The tendency of critical scratch load was not substantially consistent with the tendency of maximum compressive stress. On the other hand, the tendency of critical scratch load was substantially consistent with the tendency of strain point. Sample Groups A and B having similar strain points exhibited similar critical scratch load values, and Sample Group C, which has a relatively low strain point compared with Sample Groups A and B, exhibited a low critical scratch load value.

Referring to FIGS. 14 and 15, particularly, Sample Groups B and C were compared for comparison of scratch resistances due to a difference in strain points, even with similar stress profiles. That is, it can be seen that Sample Group B exhibits a high critical scratch load value of about 9 N or greater due to a high strain point, and thus has high scratch resistance, even though Sample Group B has the maximum compressive stress similar to that of Sample Group C.

Experimental Example 2: Glass Impact Test Evaluation

Glass impact test ("GIT") evaluation was performed. For the evaluation according to Experimental Example 2, 100 samples for each of Sample Groups A, B and C were prepared. GIT evaluation was performed by placing and fixing a strengthened glass sample on a ring, and then dropping a 60 g ball onto the surface of the sample to check the height at which the sample is broken. Herein, the 60 g ball is a ball having a weight of about 60 grams (g). If a crack does not occur when dropping the ball, the ball drop was repeated by increasing the height by 5 cm. Finally, when a crack has occurred, the height (i.e., the maximum height at which no crack occurred) immediately before the occurrence of the crack was determined as a critical drop height. Table 4 shows the average value of the critical drop height for each sample group.

TABLE 4

| Sample Group | Critical Drop Height (cm) of Glass Impact Test (GIT) |
|---|---|
| A | 33.7 |
| B | 49.2 |
| C | 29.2 |

With reference to Table 4, in the GIT evaluation, an average value of critical drop height of 33.7 cm was measured in Sample Group A, and an average value of critical drop height of 29.2 cm was measured in Sample Group C. On the other hand, an average value of critical drop height of 49.2 cm was measured in Sample Group B having a smaller maximum compressive stress than Sample Group C. Thus, Sample Group B was evaluated to have a much higher surface strength than Sample Group C. That is, in the GIT evaluation using a 60 g ball for 100 samples, Sample Group B exhibited an average value of critical drop height of about 49 cm or greater, which indicates that Sample Group B has high surface strength.

Experimental Example 3: Critical Drop Height Evaluation

Critical drop height evaluation was performed. Referring to FIG. 16, it was performed by dropping a jig model 600, to which Sample Group A, B or C is applied, having a horizontal length L1 of 80 mm, a vertical length L2 of 160 mm, a height L3 of 5 mm, and a weight of 175 g, onto Sic320 sandpaper to check the height at which each sample group is broken. The jig model 600 is a model of a smart phone to which each sample group may be applied. This experiment simulates a situation where each sample group is applied to a final product.

After dropping the jig model 600 to which Sample Group A, B, C is applied, if a crack does not occur, the drop of the jig model 600 was repeated by increasing the height by 5 cm. Finally, when a crack has occurred, the height (i.e., the maximum height at which no crack occurred) immediately before the occurrence of the crack was determined as a critical drop height h.

$$h = \frac{L_1 * L_2 * L_3 * E_{comp}}{6\,mg} * \sqrt{\frac{CS\_50 + \frac{K_{IC}}{Y * \sqrt{c}}}{\alpha * E_{glass}}}$$

[Mathematical Expression 7]

As represented in Mathematical Expression 7 above, the factors affecting the critical drop height h include a horizontal length L1, a vertical length L2 and a height L3 of the jig model 600, Young's modulus $E_{comp}$ of the jig model 600 including glass, a weight m of the jig model 600, a compressive stress CS_50 at a depth of 50 μm from the surface of a glass sample, fracture toughness $K_{IC}$ of the glass sample, a constant Y according to the crack shape, a crack length c, an extinction coefficient α which is defined as a ratio of bending energy to total kinetic energy, Young's modulus $E_{glass}$ of the glass sample, and the like.

The compressive stress affecting the critical drop height h is the compressive stress CS_50 at a depth of 50 μm from the surface. As the experimental result, as described above, since the depth of the crack generated in each sample has a median of about 50 μm, the stress at the depth point of the crack, i.e., the compressive stress CS_50 at the depth point of 50 μm from the glass surface may have a significant effect on the critical drop height h.

As a result of the critical drop height evaluation, the average value of the critical drop height for each sample group is shown in Table 5.

TABLE 5

| Sample Group | Model Critical Drop Height (cm) |
|---|---|
| A | 44.7 |
| B | 63.2 |
| C | 39.7 |

With reference to Table 5, in the model critical drop height evaluation, an average value of critical drop height of 44.7 cm was measured in Sample Group A, and an average value of critical drop height of 39.7 cm was measured in Sample Group C. On the other hand, an average value of critical drop height of 63.2 cm was measured in Sample Group B which has a smaller maximum compressive stress than Sample Group C, but has a high strain point and exhibits high scratch resistance according to the results of Experimental Example 1. Thus, Sample Group B was evaluated to have a much higher surface strength than Sample Group C. That is, in the model critical drop height evaluation for 100 samples, Sample Group B exhibited an average value of critical drop height of 60 cm or greater, which indicates that Sample Group B has high surface strength.

The invention should not be construed as being limited to the exemplary embodiments set forth herein. Rather, these exemplary embodiments are provided so that this disclosure will be thorough and complete and will fully convey the concept of the invention to those skilled in the art.

While the invention has been particularly shown and described with reference to embodiments thereof, it will be understood by those of ordinary skill in the art that various changes in form and details may be made therein without departing from the spirit or scope of the invention as defined by the following claims.

What is claimed is:

1. A glass article comprising:
   a first surface;
   a second surface opposed to the first surface;
   a first compressive region extending from the first surface to a point at a first compression depth from the first surface;
   a second compressive region extending from the second surface to a point at a second compression depth from the second surface; and
   a tensile region disposed between the first compressive region and the second compressive region,
   wherein a stress profile of the first compressive region includes a first segment between the first surface and a first transition point and a second segment between the first transition point and the point at the first compression depth,
   wherein a depth from the first surface to the first transition point is in a range of about 8.1 μm to about 9.5 μm,
   wherein a stress at the first transition point is greater than or equal to about 197 MPa, and wherein a stress at a point at about 50 μm in a depth direction from the first surface is greater than or equal to about 75 MPa.

2. The glass article of claim 1, wherein a temperature at which the glass article has a viscosity of about $10^{14.5}$ poise is in a range of about 530° C. to about 540° C.

3. The glass article of claim 1, wherein a compressive energy of the first compressive region has a value greater than or equal to about 10,500 J/m$^2$ and less than or equal to about 11,500 J/m$^2$.

4. The glass article of claim 3, wherein a first compressive energy of the first segment is less than a second compressive energy of the second segment.

5. The glass article of claim 4, wherein the second compressive energy has a magnitude of about 1.9 to about 2.2 times the first compressive energy.

6. The glass article of claim 5, wherein
the first compressive energy of the first segment has a value greater than or equal to about 3,500 J/m$^2$ and less than or equal to about 3,700 J/m$^2$, and
the second compressive energy of the second segment has a value greater than or equal to about 7,350 J/m$^2$ and less than or equal to about 7,550 J/m$^2$.

7. The glass article of claim 1, wherein a compressive stress at the first surface is in a range of about 780 MPa to about 820 MPa.

8. The glass article of claim 7, wherein the stress at the first transition point is about 0.23 to about 0.255 times the compressive stress of the first surface.

9. The glass article of claim 1, wherein the first compression depth is in a range of about 110 μm to about 120 μm.

10. The glass article of claim 9, wherein the depth of the first transition point is about 0.07 to about 0.08 times the first compression depth.

11. The glass article of claim 1,
wherein the first segment has a first slope,
wherein the second segment has a second slope,
wherein a tangent line at the first transition point has a third slope, and
wherein an absolute value of the third slope is less than an absolute value of the first slope and greater than an absolute value of the second slope.

12. The glass article of claim 11, wherein the absolute value of the third slope is in a range of about 10 MPa/μm to about 11 MPa/μm.

13. The glass article of claim 1, wherein
the glass article comprises lithium aluminosilicate, and
the glass article has a thickness in a range of about 0.69 mm to 0.71 mm.

14. The glass article of claim 1,
wherein the first compression depth corresponds to a maximum penetration depth of sodium ions, and
wherein the depth of the first transition point corresponds to a maximum penetration depth of potassium ions.

15. The glass article of claim 1,
wherein a stress profile of the second compressive region includes: a first segment between the second surface and a second transition point; and a second segment between the second transition point and the second compression depth,
wherein a depth from the second surface to the second transition point is in a range of about 8.1 μm to about 9.5 μm,
wherein a stress at the second transition point is greater than or equal to about 197 MPa, and
wherein a stress at a point of about 50 μm in a depth direction from the second surface is greater than or equal to about 75 MPa.

16. The glass article of claim 15, wherein the stress profile of the second compressive region and the stress profile of the first compressive region are symmetrical with each other.

17. The glass article of claim 1, wherein a maximum tensile stress of the tensile region is in a range of about 60 MPa to about 75 MPa.

18. The glass article of claim 1, wherein an average value of a critical drop height is greater than or equal to about 49 cm in a glass impact test evaluation of the glass article using a 60 g ball for 100 or more samples.

19. The glass article of claim 1, wherein an average value of a critical drop height is greater than or equal to about 60 cm in a critical drop height evaluation conducted by applying the glass article to a jig model having a horizontal length of about 80 mm, a vertical length of about 160 mm and a height of about 5 mm.

20. The glass article of claim 1, wherein an average value of a critical scratch load is greater than or equal to about 9 N in a critical scratch load evaluation of the glass article.

21. A display device comprising:
a display panel including a plurality of pixels;
a cover window disposed above the display panel; and
an optically transparent bonding layer disposed between the display panel and the cover window,
wherein the cover window comprises:
  a first surface;
  a second surface opposed to the first surface;
  a first compressive region extending from the first surface to a point at a first compression depth from the first surface;
  a second compressive region extending from the second surface to a point at a second compression depth from the second surface; and
  a tensile region disposed between the first compressive region and the second compressive region,
wherein a stress profile of the first compressive region includes: a first segment between the first surface and a first transition point; and a second segment between the first transition point and the first compression depth,
wherein a depth from the first surface to the first transition point is in a range of about 8.1 μm to about 9.5 μm,
wherein a stress at the first transition point is greater than or equal to about 197 MPa, and
wherein a stress at a point of about 50 μm in a depth direction from the first surface is greater than or equal to about 75 MPa.

22. The display device of claim 21,
wherein the cover window includes a glass article including lithium aluminosilicate and having a thickness in a range of about 0.69 mm to about 0.71 mm,
wherein a compressive energy of the first compressive region has a value greater than or equal to about 10,500 J/m$^2$ and less than or equal to about 11,500 J/m$^2$,
wherein a first compressive energy of the first segment has a value greater than or equal to about 3,500 J/m$^2$ and less than or equal to about 3,700 J/m$^2$,
wherein a second compressive energy of the second segment has a value greater than or equal to about 7,350 J/m$^2$ and less than or equal to about 7,550 J/m$^2$,
wherein a compressive stress at the first surface is in a range of about 780 MPa to about 820 MPa, and wherein the first compression depth is in a range of about 110 μm to about 120 μm.

\* \* \* \* \*